United States Patent
Schmid et al.

(10) Patent No.: US 11,088,767 B2
(45) Date of Patent: Aug. 10, 2021

(54) POINT OF SALE DEVICE AND METHOD FOR OPERATING SAME

(71) Applicant: VERIFONE, INC., San Jose, CA (US)

(72) Inventors: Michael Schmid, Sacramento, CA (US); Jack Richard Grenfell, Rocklin, CA (US); Marinel Rivera, Singapore (SG); Mehran Mirkazemi, Rocklin, CA (US); Scott McKibben, Davis, CA (US); Christopher Delgado, Rocklin, CA (US); Ephraim Chrolovich, Netanya (IL)

(73) Assignee: VERIFONE, INC., San Jose, CA (US)

( * ) Notice: Subject to any disclaimer, the term of this patent is extended or adjusted under 35 U.S.C. 154(b) by 18 days.

(21) Appl. No.: 14/661,328

(22) Filed: Mar. 18, 2015

(65) Prior Publication Data

US 2015/0195049 A1    Jul. 9, 2015

Related U.S. Application Data

(63) Continuation of application No. 13/774,426, filed on Feb. 22, 2013, now Pat. No. 9,020,427.

(60) Provisional application No. 61/604,594, filed on Feb. 29, 2012.

(51) Int. Cl.

| H04B 15/02 | (2006.01) |
|---|---|
| H04B 5/00 | (2006.01) |
| G06Q 20/12 | (2012.01) |
| G07G 1/12 | (2006.01) |
| G09G 3/36 | (2006.01) |

(52) U.S. Cl.
CPC ............ *H04B 15/02* (2013.01); *G06Q 20/12* (2013.01); *G07G 1/12* (2013.01); *G09G 3/3611* (2013.01); *G09G 3/3618* (2013.01); *H04B 5/00* (2013.01); *H04B 5/0075* (2013.01); *G09G 2310/08* (2013.01); *G09G 2380/00* (2013.01)

(58) Field of Classification Search
CPC ...................................................... H04B 15/02
USPC ........................................ 235/375, 383, 492
See application file for complete search history.

(56) References Cited

U.S. PATENT DOCUMENTS

| 7,424,977 B2 | 9/2008 | Smets et al. |
|---|---|---|
| 9,020,427 B2 | 4/2015 | Schmid et al. |
| 2002/0103002 A1 | 8/2002 | Tendler |
| 2003/0144026 A1 | 7/2003 | Hirota |
| 2005/0075689 A1* | 4/2005 | Toy .................... A61N 1/37235 607/60 |

(Continued)

FOREIGN PATENT DOCUMENTS

WO    2009/009705 A1    1/2009

OTHER PUBLICATIONS

Introduction to graphics and LCD technologies, NXP Products Line Microcontrollers Business Line Standard ICs, Downloaded on 2013.

(Continued)

*Primary Examiner* — Rafferty D Kelly
(74) *Attorney, Agent, or Firm* — Greenberg Traurig LLP

(57) ABSTRACT

A point of sale device including an LCD display, a contactless payment antenna arranged in propinquity to the LCD display, LCD control circuitry and contactless communication circuitry associated with the contactless payment antenna, the LCD control circuitry and the contactless communication circuitry operating at least partially in time coordination with each other in order to prevent interference therebetween.

20 Claims, 13 Drawing Sheets

(56) References Cited

U.S. PATENT DOCUMENTS

| | | | |
|---|---|---|---|
| 2006/0283940 A1* | 12/2006 | Kuo | G06Q 20/20 235/383 |
| 2008/0113631 A1* | 5/2008 | Lee | H04B 1/40 455/90.3 |
| 2009/0167699 A1 | 7/2009 | Rosenblatt et al. | |
| 2012/0104094 A1* | 5/2012 | Chrolovich | G06K 7/10128 235/380 |
| 2013/0225075 A1 | 8/2013 | Schmid et al. | |

OTHER PUBLICATIONS

Sharp LCD Application Note, LCD Interfacing, Interfacing LCD Panels to Microcontrollers. 2007.
European Search Report dated Aug. 8, 2013, issued in European Patent Application No. 13157298.4.
U.S. Appl. No. 61/604,594, filed Feb. 29, 2012.
Notice of Allowance dated Jan. 22, 2015, which issued during the prosecution of U.S. Appl. No. 13/774,426.
Notice of Allowance dated Jan. 8, 2015, which issued during the prosecution of U.S. Appl. No. 13/774,426.
An Office Action dated Nov. 13, 2014, which issued during the prosecution of U.S. Appl. No. 13/774,426.
European Search Report dated Nov. 2, 2015, which issued during the prosecution of Applicant's European App No. 13157298.4.

* cited by examiner

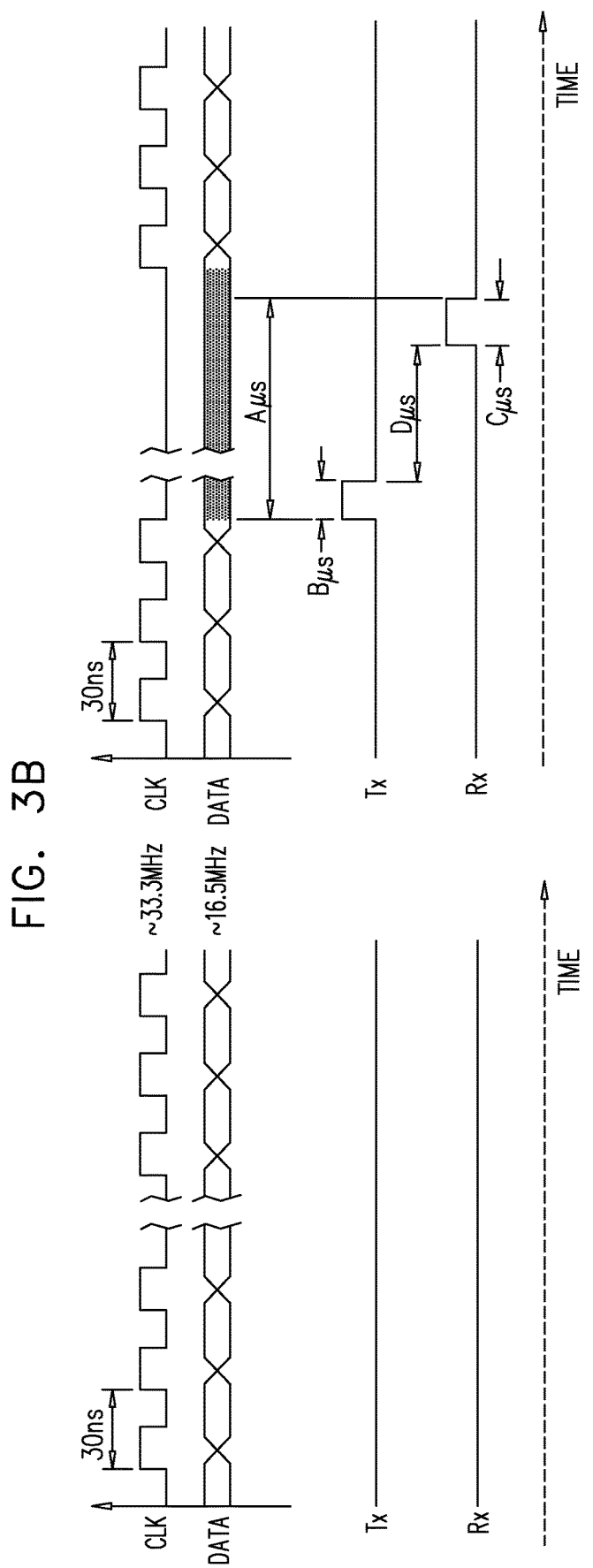

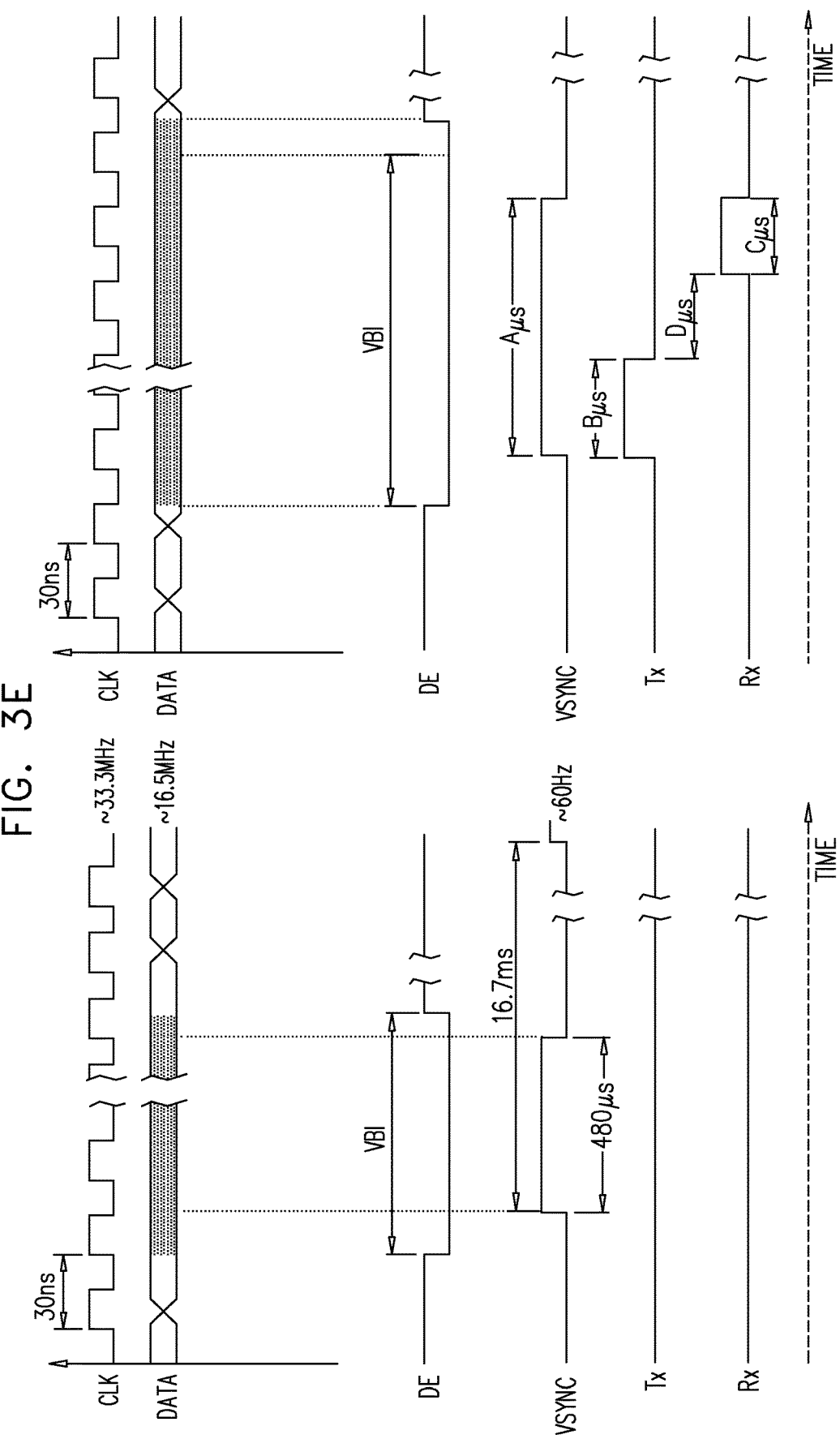

POINT OF SALE DEVICE AND METHOD FOR OPERATING SAME

REFERENCE TO RELATED APPLICATIONS

This application is a continuation of U.S. patent application Ser. No. 13/774,426, filed Feb. 22, 2013, entitled "POINT OF SALE DEVICE AND METHOD FOR OPERATING SAME", which claims priority of U.S. Provisional Patent Application Ser. No. 61/604,594, filed Feb. 29, 2012 and entitled REDUCED LCD REFRESH RATE ESPECIALLY USEFUL FOR POINT OF SALE TERMINAL, the disclosure of which is hereby incorporated by reference.

FIELD OF THE INVENTION

The present invention relates to point of sale devices generally.

BACKGROUND OF THE INVENTION

Various types of point of sale devices are known. These include point of sale devices having contactless, Near Field Communication (NFC) or other proximity and vicinity communication functionality.

SUMMARY OF THE INVENTION

The present invention seeks to provide improved point of sale devices. There is thus provided in accordance with a preferred embodiment of the present invention a point of sale device including an LCD display, a contactless payment antenna arranged in propinquity to the LCD display, LCD control circuitry and contactless communication circuitry associated with the contactless payment antenna, the LCD control circuitry and the contactless communication circuitry operating at least partially in time coordination with each other in order to prevent interference therebetween.

Preferably, the LCD control circuitry has at least first and second refresh rates and is operative at a first, lower refresh rate during operation of the contactless communication circuitry in carrying out a transaction and at a second, higher refresh rate at times when the contactless communication circuitry is not carrying out a transaction.

In accordance with a preferred embodiment of the present invention, the contactless communication circuitry is operative at least during a vertical blanking interval (VBI) in the operation of the LCD control circuitry. Alternatively, the contactless communication circuitry is operative at least during a VSYNC signal duration in the operation of the LCD control circuitry. Alternatively, the contactless communication circuitry is operative at least during an HSYNC signal duration in the operation of the LCD control circuitry.

Preferably, the contactless payment antenna is disposed behind the LCD display. Alternatively, the contactless payment antenna is disposed surrounding the LCD display.

In accordance with a preferred embodiment of the present invention, the LCD control circuitry has at least first and second duty cycles for writing of data to the LCD and is operative at a first, lower duty cycle during operation of the contactless communication circuitry in carrying out a transaction and at a second, higher duty cycle at times when the contactless communication circuitry is not carrying out a transaction.

There is also provided in accordance with another preferred embodiment of the present invention a method of operating an LCD display in propinquity to a contactless antenna, the method including providing LCD control circuitry and contactless communication circuitry associated with the contactless antenna and operating the LCD control circuitry and the contactless communication circuitry in time coordination with each other in order to prevent interference therebetween.

Preferably, the method also includes operating the LCD control circuitry at a first, lower refresh rate during operation of the contactless communication circuitry in carrying out a transaction and at a second, higher refresh rate at times when the contactless communication circuitry is not carrying out a transaction.

In accordance with a preferred embodiment of the present invention the method also includes operating the contactless communication circuitry at least during a vertical blanking interval in the operation of the LCD control circuitry. Alternatively, the method also includes operating the contactless communication circuitry at least during a VSYNC signal duration in the operation of the LCD control circuitry. In another alternative embodiment, the method also includes operating the contactless communication circuitry at least during an HSYNC signal duration in the operation of the LCD control circuitry.

There is further provided in accordance with yet another preferred embodiment of the present invention a point of sale device including an LCD display, a contactless payment antenna arranged in propinquity to the LCD display, LCD control circuitry, contactless communication circuitry associated with the contactless payment antenna and coordination control circuitry operative to control operation of the LCD control circuitry thereby to reduce interference to operation of the contactless communication circuitry resulting from operation of the LCD display.

Preferably, the coordination control circuitry is operative to cause the LCD control circuitry and the contactless communication circuitry to operate in time coordination with each other in order to reduce interference therebetween. In accordance with a preferred embodiment of the present invention the coordination control circuitry is operative to cause the operation of the LCD control circuitry and the contactless communication circuitry to be such that the contactless communication circuitry generally operates when data is not being written on the LCD display, in order to reduce interference therebetween.

Preferably, the coordination control circuitry is operative to vary at least one of the clock signal and the data enable signal in order to reduce interference between the LDC display and operation of the contactless communication circuitry. Additionally or alternatively, the coordination control circuitry is operative to disable the data enable signal during at least some of transmit/receive time duration of the contactless communication circuitry. Alternatively or additionally, the coordination control circuitry is operative to disable the data enable signal during polling operation of the contactless communication circuitry. Additionally or alternatively, the coordination control circuitry is operative to disable the data enable signal during payment data transfer operation of the contactless communication circuitry.

In accordance with a preferred embodiment of the present invention, the coordination control circuitry is operative to slow the clock signal during at least some of transmit/receive time duration of the contactless communication circuitry. Additionally or alternatively, the coordination control circuitry is operative to slow the clock signal during polling operation of the contactless communication circuitry. Alternatively or additionally, the coordination control circuitry is operative to slow the clock signal during payment data transfer operation of the contactless communication circuitry.

Preferably, the coordination control circuitry is operative to slow the clock signal to an extent responsive to an amount of data to be transferred during payment data transfer operation of the contactless communication circuitry.

In accordance with a preferred embodiment of the present invention, the coordination control circuitry is operative to stop the clock signal during at least some of transmit/receive time duration of the contactless communication circuitry. Preferably, the coordination control circuitry is operative to stop the clock signal during polling operation of the contactless communication circuitry. Alternatively or additionally, the coordination control circuitry is operative to stop the clock signal during payment data transfer operation of the contactless communication circuitry.

Preferably, the coordination control circuitry is operative to stop the clock signal to an extent responsive to an amount of data to be transferred during payment data transfer operation of the contactless communication circuitry.

In accordance with a preferred embodiment of the present invention the coordination control circuitry is operative to at least partially synchronize payment data transfer operation of the contactless communication circuitry with an HSYNC signal of the LCD display.

There is even further provided in accordance with still another preferred embodiment of the present invention a method of operating an LCD display in propinquity to a contactless antenna, the method including providing LCD control circuitry and contactless communication circuitry associated with the contactless antenna and controlling operation of the LCD control circuitry thereby to reduce interference to operation of the contactless communication circuitry resulting from operation of the LCD display.

Preferably, the method also includes operating the contactless communication circuitry generally when data is not being written on the LCD display, in order to reduce interference therebetween.

In accordance with a preferred embodiment of the present invention the LCD control circuitry provides a clock signal and a data enable signal and at least one of the clock signal and the data enable signal is varied in order to reduce interference between the LDC display and operation of the contactless communication circuitry.

Preferably, the data enable signal is disabled during at least some of transmit/receive time duration of the contactless communication circuitry. Additionally, the data enable signal is disabled during payment data transfer operation of the contactless communication circuitry.

In accordance with a preferred embodiment of the present invention, the clock signal is slowed during at least some of transmit/receive time duration of the contactless communication circuitry. Alternatively or additionally, the clock signal is slowed during polling operation of the contactless communication circuitry. Additionally or alternatively, the clock signal is slowed during payment data transfer operation of the contactless communication circuitry.

Preferably, the clock signal is slowed to an extent responsive to an amount of data to be transferred during payment data transfer operation of the contactless communication circuitry.

In accordance with a preferred embodiment of the present invention, the clock signal is stopped during at least some of transmit/receive time duration of the contactless communication circuitry. Additionally or alternatively, the clock signal is stopped during payment data transfer operation of the contactless communication circuitry.

Preferably, the clock signal is stopped to an extent responsive to an amount of data to be transferred during payment data transfer operation of the contactless communication circuitry.

In accordance with a preferred embodiment of the present invention, at least payment data transfer operation of the contactless communication circuitry is least partially synchronized with an HSYNC signal of the LCD display.

BRIEF DESCRIPTION OF THE DRAWINGS

The present invention will be understood and appreciated more fully from the following detailed description, taken in conjunction with the drawings in which:

FIG. 3B is a pair of simplified timing diagrams illustrating a change in the timing operation of a display in coordination with operation of contactless payment circuitry of the point of sale device of FIG. 1 in accordance with a second embodiment of the present invention;

FIG. 3E is a pair of simplified timing diagrams illustrating a change in the timing operation of a display in coordination with operation of contactless payment circuitry of the point of sale device of FIG. 1 in accordance with a fifth embodiment of the present invention;

FIG. 3I is a pair of simplified timing diagrams illustrating a change in the timing operation of a display in coordination with operation of contactless payment circuitry of the point of sale device of FIG. 1 in accordance with a ninth embodiment of the present invention.

DETAILED DESCRIPTION OF PREFERRED EMBODIMENTS

Figure 1:
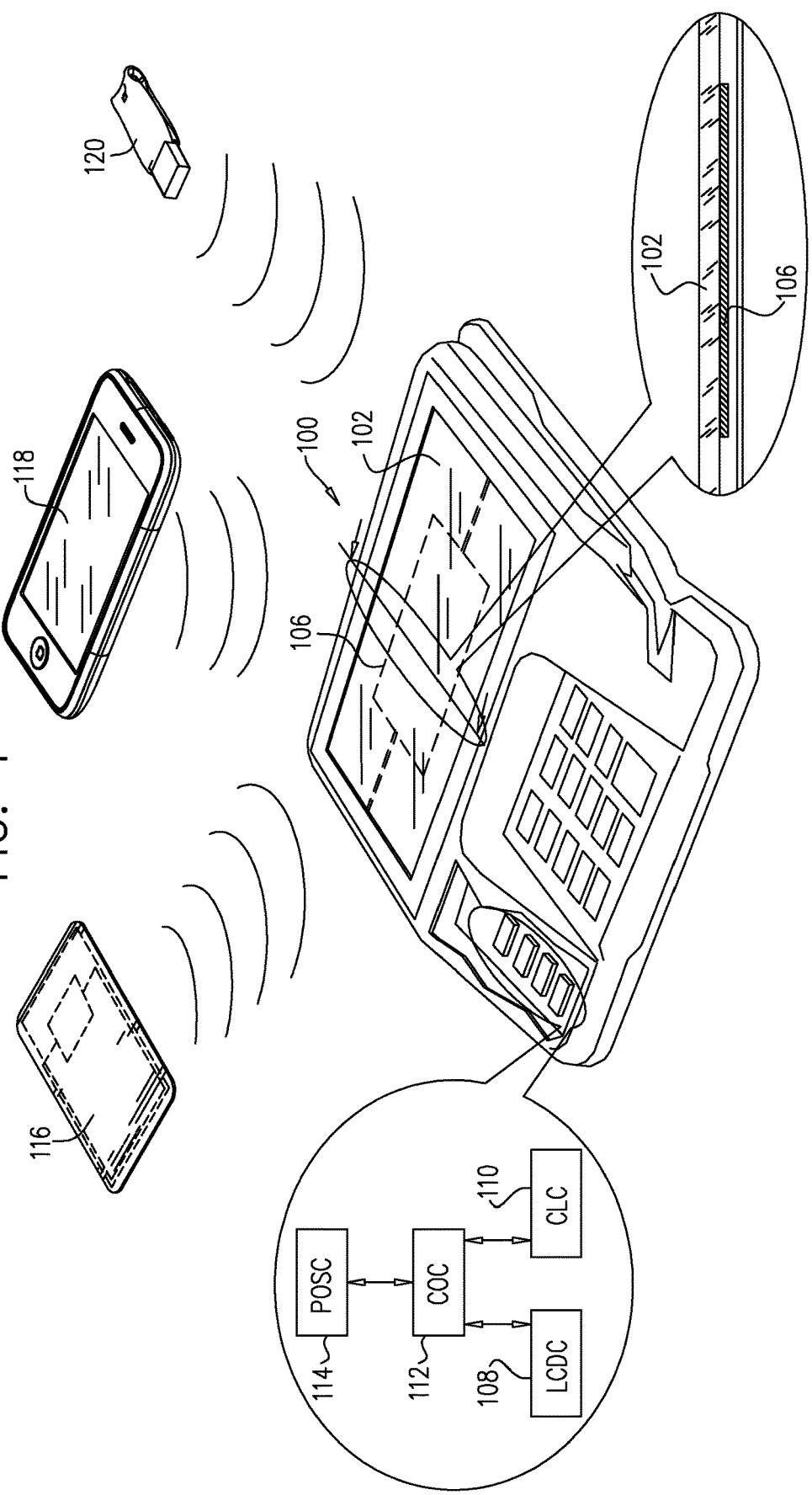
FIG. 1 is a simplified illustration of operation of a point of sale device constructed in accordance with a preferred embodiment of the present invention.

Reference is now made to FIG. 1, which is a simplified illustration of operation of a point of sale device constructed in accordance with a preferred embodiment of the present invention. As seen in FIG. 1, there is provided a point of sale device 100 having contactless, Near Field Communication (NFC) or other proximity and vicinity communication functionality, such as a Model MX 925, commercially available from Verifone, Inc. The point of sale device 100 preferably includes an LCD display 102. Point of sale device 100 also preferably employs contactless, NFC or other proximity and vicinity communication functionality for effecting transactions. It is appreciated that any other suitable device, such as a suitably programmed mobile communicator, having point of sale functionality, may be employed in the present invention.

In accordance with a preferred embodiment of the present invention, the point of sale device 100 includes a contactless payment antenna 106 arranged in propinquity to the LCD display 102 and preferably at the underside thereof. Additionally, in accordance with a preferred embodiment of the present invention there is provided LCD control (LCDC) circuitry 108 and contactless communication (CLC) circuitry 110, employing contactless, NFC or other proximity and vicinity communication functionality for effecting transactions, associated with the contactless payment antenna 106. There is also preferably provided coordination control (COC) circuitry 112 operative to control operation of the LCD control circuitry 108, thereby to reduce interference to operation of the contactless communication circuitry 110 resulting from operation of the LCD display. The point of sale device 100 also preferably includes conventional point of sale control (POSC) circuitry 114.

It is appreciated that LCD control circuitry 108, contactless communication circuitry 110, coordination control circuitry 112 and point of sale control circuitry 114 may be incorporated in one or more integrated circuits.

It is appreciated that LCD control circuitry 108, contactless communication circuitry 110, coordination control circuitry 112 and point of sale control circuitry 114 may be incorporated in at least one microprocessor programmed so as to perform the functions described herein.

In accordance with a preferred embodiment of the present invention, the coordination control circuitry 112 is programmed so as to perform the functions described hereinbelow with reference to FIGS. 2A-3I.

It is appreciated that the point of sale device 100, as described above, is suitable for transaction operation with any suitable payment medium, such as a contactless payment card 116, a NFC equipped mobile communicator 118 and any other suitable portable communication device 120. Preferably the overall size of the contactless payment antenna 106 is generally similar to the overall size of contactless payment card 116.

Figure 2A:
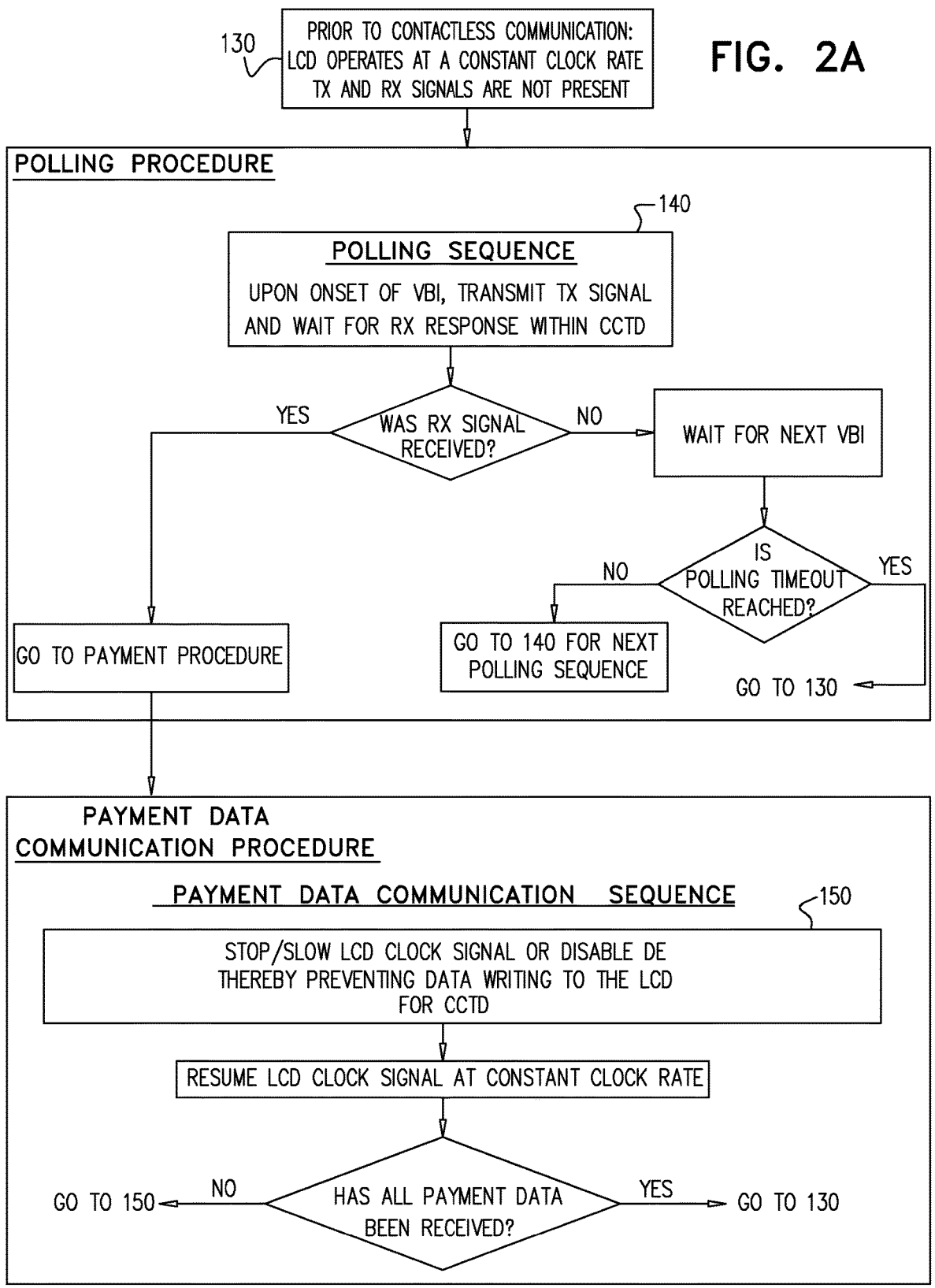
FIG. 2A is a simplified flowchart illustrating a first embodiment of the operation of the point of sale device of FIG. 1.
Figure 2B:
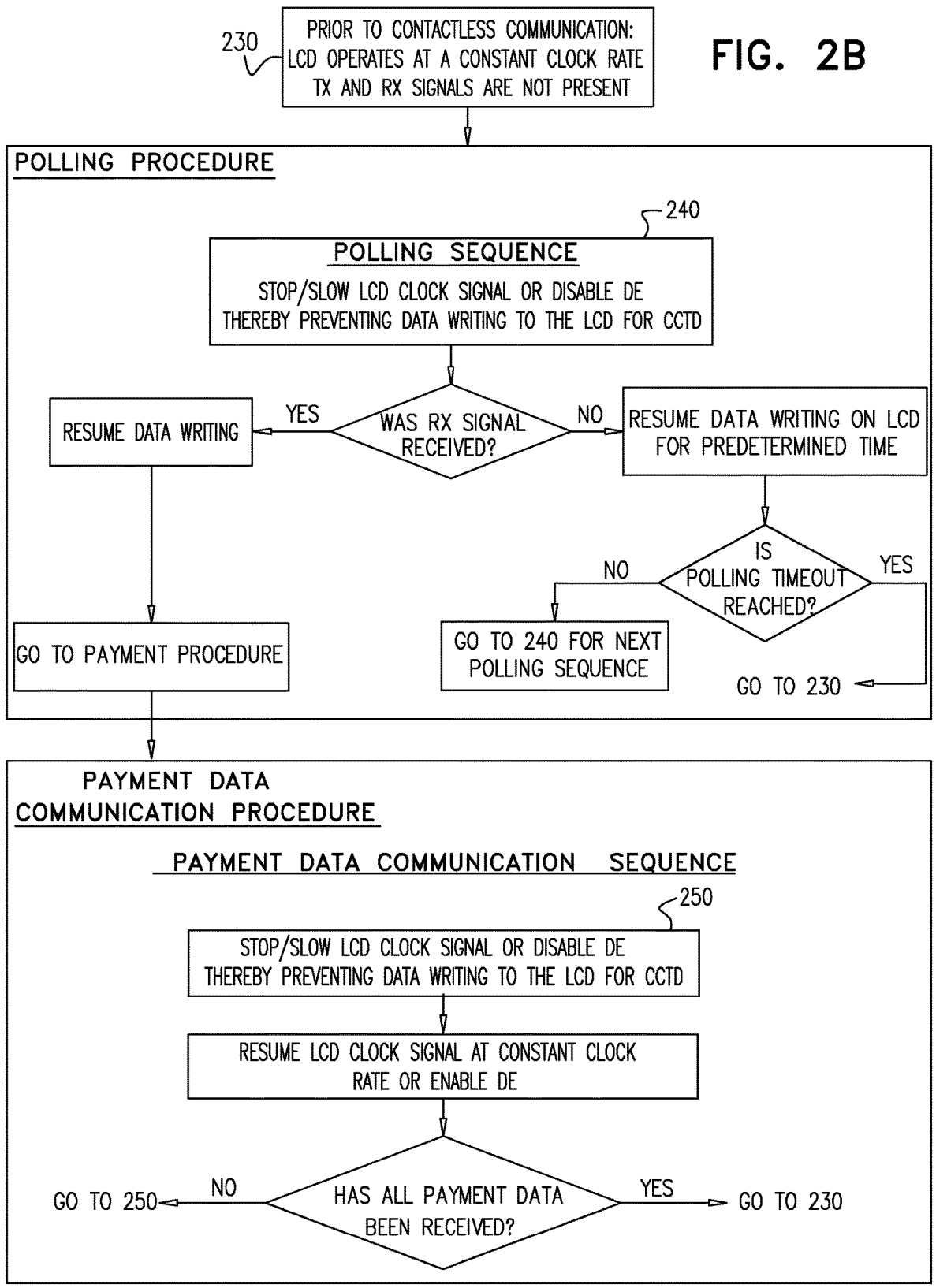
FIG. 2B is a simplified flowchart illustrating a second and a third embodiment of the operation of the point of sale device of FIG. 1.
Figure 2C:
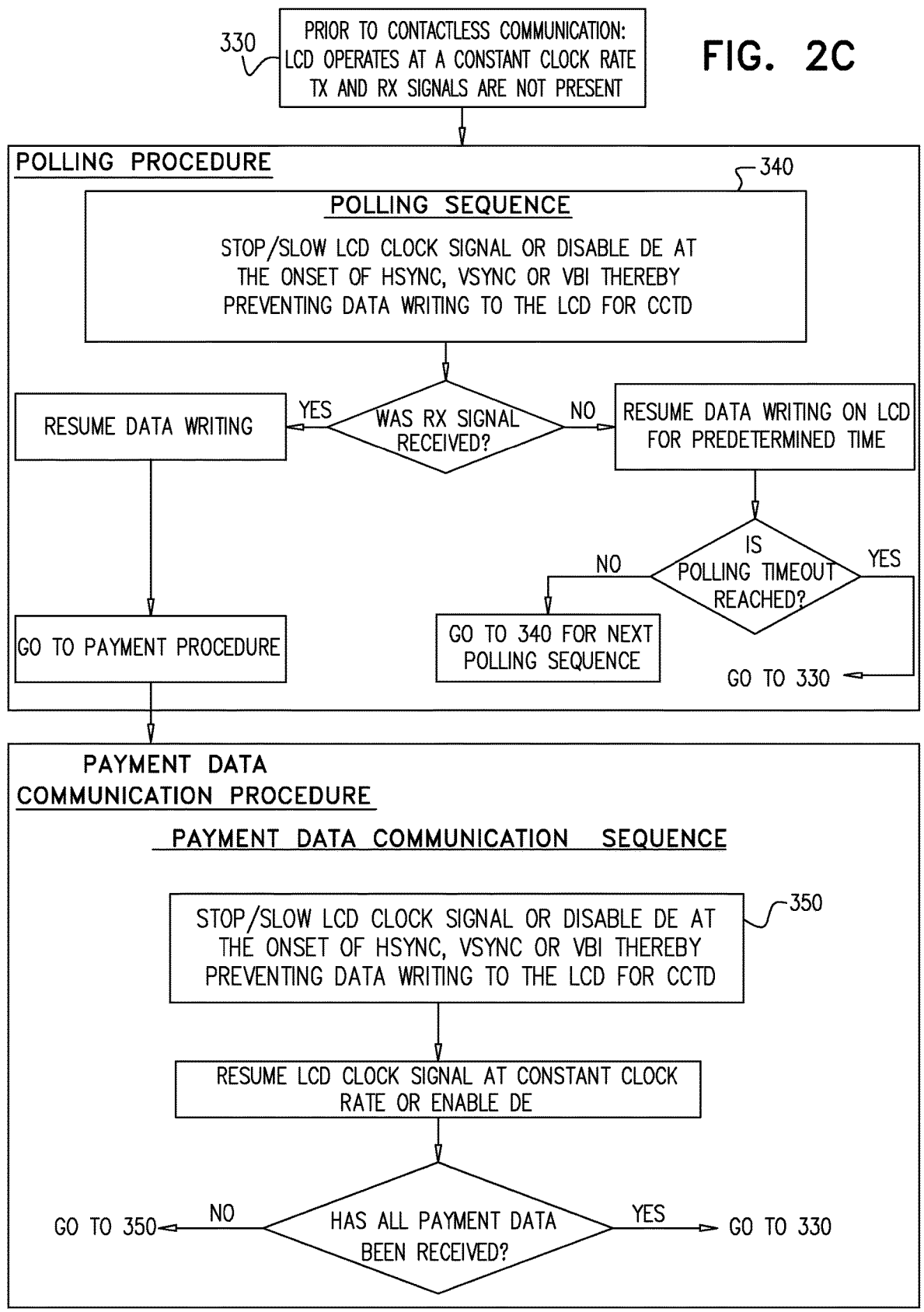
FIG. 2C is a simplified flowchart illustrating a fourth and a fifth embodiment of the operation of the point of sale device of FIG. 1.

Reference is now made to FIGS. 2A-2C, which illustrate various alternative embodiments of the present invention, and to FIGS. 3A-3I, which are simplified timing diagrams illustrating the various alternative embodiments.

It is appreciated that the frequencies and time durations mentioned herein are characteristic of conventional LCD displays having 800×480 pixel resolution, such as that employed in the MX 925.

Figure 3A:
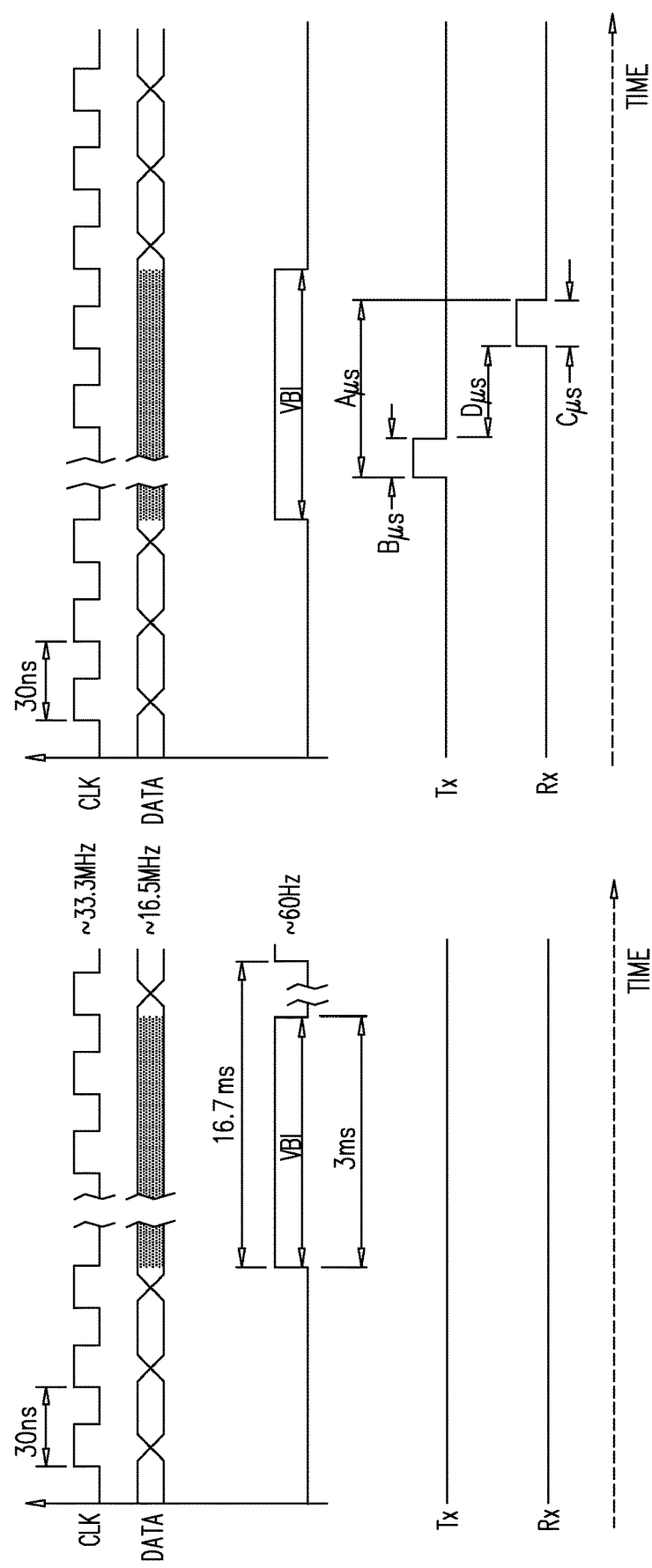
FIG. 3A is a pair of simplified timing diagrams illustrating coordinated timing operation of a display and contactless payment circuitry of the point of sale device of FIG. 1 in accordance with a first embodiment of the present invention.
Figure 3C:
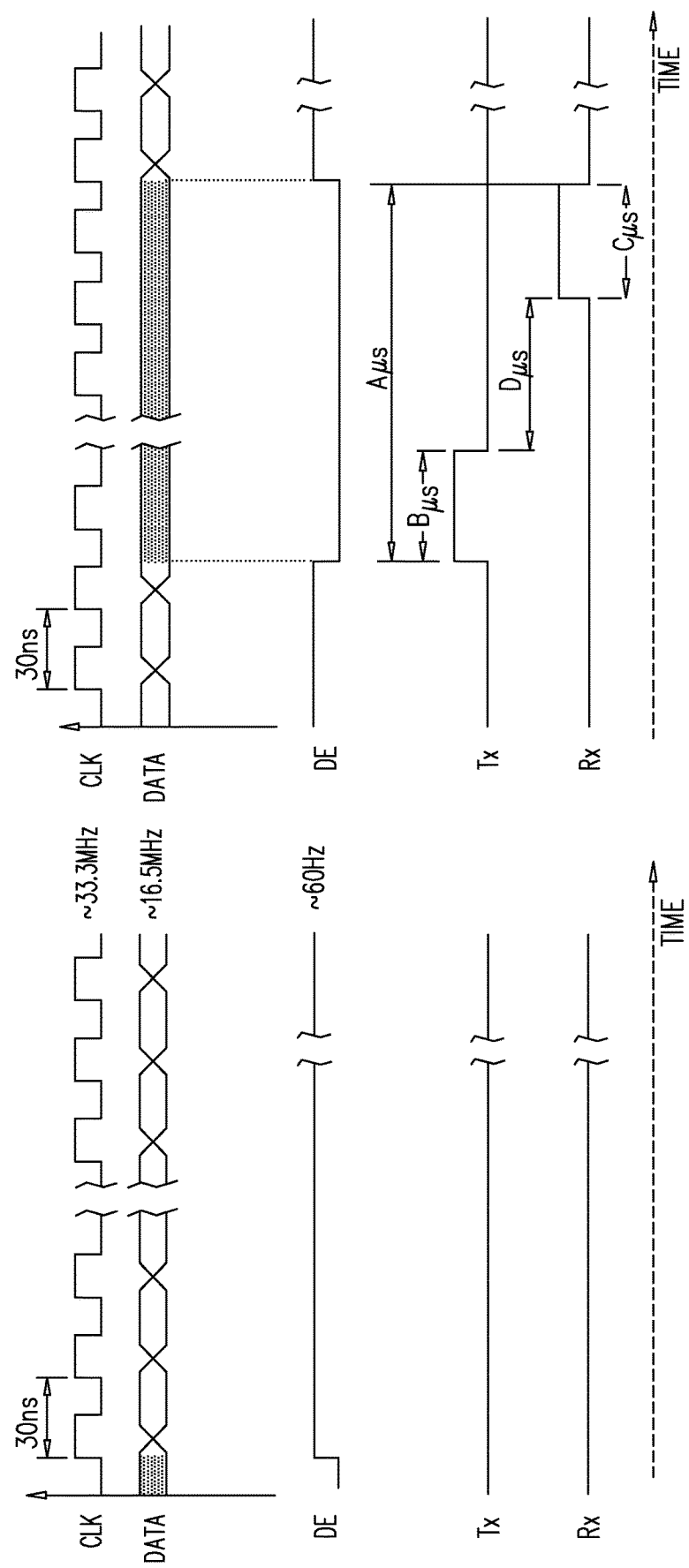
FIG. 3C is a pair of simplified timing diagrams illustrating a change in the timing operation of a display in coordination with operation of contactless payment circuitry of the point of sale device of FIG. 1 in accordance with a third embodiment of the present invention.

Reference is now made specifically to FIG. 2A, which illustrates a first embodiment of the invention, wherein polling takes place during a vertical blanking interval (VBI) and payment data communication requires stopping or slowing an LCD clock or disabling a data enable (DE) signal, and to FIGS. 3A-3C, which are corresponding simplified timing diagrams.

In an initial stage, the coordination control circuitry 112 (FIG. 1) instructs the LCD control circuitry 108 (FIG. 1) to operate the LCD clock, which governs the LCD refresh rate and data writing to the LCD display 102, at its normal clock rate, typically approximately 33.3 MHz.

As seen in step 130 of FIG. 2A and at the left side of FIG. 3A, at an initial stage, the LCD clock operates at a constant rate, typically approximately 33.3 MHz, and data is written to the LCD display 102 at a constant rate, typically approximately 16.5 MHz.

A vertical blanking interval (VBI) is provided with a frequency of 60 Hz and thus occurs typically every 16.7 ms. A typical VBI is of duration 3 ms.

At this initial stage, contactless communication, namely polling and payment data communication, does not yet take place. Accordingly, it is seen that transmit and receive signals, respectively designated Tx and Rx, which exist during contactless communication, are not yet present.

Normally, the point of sale device 100 initiates contactless communication via antenna 106 (FIG. 1) using a polling procedure. The polling procedure typically includes a number of polling sequences 140 corresponding to a number of different operational modes of payment media. For example, various different payment cards may operate in various different operational modes which may be governed by the same or different standards. For example, type A and type B payment cards may operate according to ISO/IEC Standard 14443 with different timing. These various operational modes may involve different durations of transmit and receive signals, respectively designated Tx and Rx, and different time separations therebetween.

The overall time duration required between the onset of a Tx signal and the end of the maximum period allocated for receipt of an Rx signal is defined a contactless communication time duration (CCTD). In the absence of a received Rx signal, the CCTD is a fixed predetermined period, typically 430 microseconds for type A cards and 1050 microseconds for type B cards, however if an Rx signal is received, the CCTD preferably extends until receipt thereof has been completed. In accordance with a preferred embodiment of the invention, data writing to the LCD generally does not occur during the CCTD or at least during most of it.

Typically, the polling procedure starts with a type A polling sequence, which in the absence of a response from a type A medium within a predetermined time, typically 7 ms, then proceeds with a type B polling sequence. Other types of polling sequences may follow.

In the embodiment shown in FIG. 2A, at least some of the contactless communication via antenna 106 for polling takes place during the VBI, when data writing to the LCD display 102 generally does not take place in any event, as indicated by a grey region of the data signal shown on the right side of FIG. 3A. Preferably, contactless communication begins at the onset of the VBI. For example, the type A polling sequence may take place during a first VBI and the type B polling sequence may take place during a subsequent VBI. In such a case, the start of the type B polling sequence follows the start of the type A polling sequence by approximately 16.7 ms.

Alternatively, both the type A and type B polling sequences may take place during the same VBI, if it is sufficiently long.

As seen in FIG. 2A and on the right side of FIG. 3A, typically a type A polling sequence is initiated by device 100 by transmitting a polling Tx signal via antenna 106. In this case, the CCTD, designated by A, has a duration of up to approximately 500 microseconds and the polling Tx signal, designated by B, has a duration of approximately 100 microseconds. If a type A payment medium is within operational range of antenna 106, the type A payment medium will respond within a further duration, designated by D, of approximately 150 microseconds, causing a polling Rx signal to be received by antenna 106. The duration of the polling Rx signal, designated by C, is typically approximately 200 microseconds.

Referring briefly to the right side of FIG. 3A, it is seen that for a typical type A polling sequence, the durations designated by letters, A, B, C and D in FIG. 3A are as follows:
A=approximately 500 microseconds
B=approximately 100 microseconds
C=approximately 200 microseconds
D=approximately 150 microseconds If a polling Rx signal is received, polling is terminated. If, however, a polling Rx signal is not received, after a predetermined time period, typically 7 milliseconds, from the start of the transmission of the type A polling Tx signal via antenna 106, a type B polling sequence is initiated.

The type B polling sequence may be essentially the same as the type A polling sequence described hereinabove with different time durations.

For a typical type B polling sequence, the durations designated by letters, A, B, C and D in FIG. 3A are as follows:
A=approximately 2.5 ms
B=approximately 400 microseconds
C=approximately 1400 microseconds
D=approximately 650 microseconds It is appreciated that during the VBI, the clock continues to run normally and data is not being written. Following the VBI, data writing to the LCD resumes.

Once a valid polling Rx signal has been received, a determination is made as to what type of payment medium has transmitted the polling Rx signal and a suitable payment data communication procedure, typically including at least one payment data communication sequence 150, is initiated, for example by transmitting a payment data Tx signal via antenna 106.

In accordance with an embodiment of the invention, during the payment data communication sequence 150, data is generally not written to the LCD. This is achieved either by slowing or stopping operation of the LCD clock, as illustrated in FIG. 3B. Alternatively, this is achieved by disabling the data enable (DE) signal, as illustrated in FIG. 3C. The alternative embodiment of disabling the DE signal is used only in embodiments where the DE signal is readily manipulatable. It is noted that the DE signal is normally disabled during the VBI.

It is noted that when the LCD clock is slowed, as opposed to stopped, some data writing typically takes place during the CCTD. For example, if the LCD clock rate is slowed to typically $\frac{1}{200}^{th}$ of its usual rate, a few lines of pixels are written during a payment data communication. This relatively small amount of data writing is considered to be insignificant in terms of interference with payment data communication and is therefore ignored in the drawings and the description which follows.

As seen on the right side of FIG. 3B, in one embodiment of the present invention, the coordination control circuitry 112 (FIG. 1) instructs the LCD control circuitry 108 (FIG. 1) to stop the LCD clock signal, thereby stopping data writing to the LCD display 102 for the duration of the CCTD.

The LCD clock is stopped typically without regard to the timing of the VBI or a VSYNC signal. Alternatively, the stopping of the clock may be coordinated with either or both of the VBI and the VSYNC signal. Alternatively, the precise time at which slowing or stopping of the LCD clock is initiated may be coordinated with an HSYNC signal in order to reduce degradation of the LCD image.

As seen on the right side of FIG. 3B, contactless data is transmitted via antenna 106, as indicated by the Tx signal, and where a payment medium is within operational range of antenna 106, contactless data is received via antenna 106 from the payment medium.

It is appreciated that alternatively, instead of stopping the operation of the LCD clock, the clock may be slowed sufficiently for the duration of the CCTD, as described hereinabove.

It is appreciated from a consideration of the right side of FIG. 3B that upon completion of the duration of CCTD, the LCD clock typically resumes its constant rate operation, typically at 33.3 MHz, and data writing to the LCD display 102 resumes.

Alternatively the LCD clock remains stopped until all payment data has been received by the point of sale device 100.

In an alternative embodiment of the present invention, seen on the right side of FIG. 3C, the coordination control circuitry 112 (FIG. 1) instructs the LCD control circuitry 108 (FIG. 1) to disable the DE signal, thereby stopping data writing to the LCD display 102 for the duration of the CCTD.

The DE signal is disabled typically without regard to the timing of the VBI or the VSYNC signal. Alternatively, the disabling of the DE signal may be coordinated with either or both of the VBI and the VSYNC signal. The precise time at which the DE signal is initially disabled may be coordinated with an HSYNC signal in order to reduce degradation of the LCD image.

The CCTD typically continues for a duration, designated by A, of a few tens of milliseconds and the payment data Tx signal also has a duration, designated by B, of up to tens of milliseconds. The payment medium will respond within a further duration, designated by D, of approximately a few hundred microseconds, causing a payment data Rx signal to be received by antenna 106. The duration of the payment data Rx signal, designated by C, is typically approximately a few tens of milliseconds.

The foregoing payment data communication sequence is repeated until all payment data has been received by the point of sale device 100. This typically takes up to approximately one second.

It is appreciated from a consideration of the right side of FIG. 3C that upon completion of the duration of CCTD, the DE signal is again enabled and data writing to the LCD display 102 resumes.

Alternatively, the DE signal remains disabled until all payment data has been received by the point of sale device 100.

Reference is now made specifically to FIG. 2B, which illustrates another embodiment of the present invention wherein polling and payment data communication require stopping or slowing an LCD clock or disabling a data enable (DE) signal, and to FIGS. 3B-3C, which are corresponding simplified timing diagrams.

In an initial stage, the coordination control circuitry 112 (FIG. 1) instructs the LCD control circuitry 108 (FIG. 1) to operate an LCD clock, which governs the LCD refresh rate and data writing to the LCD display 102, at its normal clock rate.

As seen in step 230 in FIG. 2B and at the left side of FIG. 3B, at the initial stage, the LCD clock operates at a constant rate, typically approximately 33.3 MHz and data is written to the LCD display 102 at a constant rate, typically approximately 16.5 MHz.

At this initial stage, contactless communication, namely polling and payment data communication, does not yet take place. Accordingly, it is seen that transmit and receive signals, respectively designated Tx and Rx, which exist during contactless communication, are not yet present.

Normally, the point of sale device 100 initiates contactless communication via antenna 106 (FIG. 1) using a polling procedure. The polling procedure typically includes a number of polling sequences 240 corresponding to a number of different operational modes of payment media. For example, various different payment cards may operate in various different operational modes which may be governed by the same or different standards. For example, type A and type B payment cards may operate according to ISO/IEC Standard 14443 with different timing. These various operational modes may involve different durations of transmit and receive signals, respectively designated Tx and Rx, and different time separations therebetween.

The overall time duration required between the onset of a Tx signal and the end of the maximum period allocated for receipt of an Rx signal is defined a contactless communication time duration (CCTD). In the absence of a received Rx signal, the CCTD is a fixed predetermined period, typically 430 microseconds for type A cards and 1050 microseconds for type B cards, however if an Rx signal is received, the CCTD preferably extends until receipt thereof has been completed. In accordance with a preferred embodiment of the invention, data writing to the LCD generally does not occur during the CCTD or at least during most of it.

Typically, the polling procedure starts with a type A polling sequence, which in the absence of a response from a type A medium within a predetermined time, typically 7 ms, then proceeds with a type B polling sequence. Other types of polling sequences may follow.

In the embodiment shown in FIG. 2B, at least some of the contactless communication via antenna 106 for polling takes place when the LCD clock is stopped or slowed and data writing generally does not take place.

As seen on the right side of FIG. 3B, in this embodiment of the invention, the coordination control circuitry 112 (FIG. 1) instructs the LCD control circuitry 108 (FIG. 1) to stop the LCD clock signal, thereby stopping data writing to the LCD display 102 for the duration of the CCTD.

The LCD clock is slowed or stopped typically without regard to the timing of the VBI or the VSYNC signal. The precise time at which slowing or stopping of the LCD clock is initiated may be coordinated with the HSYNC signal in order to reduce degradation of the LCD image.

As seen in FIG. 2B and on the right side of FIG. 3B, typically a type A polling sequence is initiated by device 100 by transmitting a polling Tx signal via antenna 106. In this case, the CCTD, designated by A, has a duration of up to approximately 500 microseconds and the polling Tx signal, designated by B, has a duration of approximately 100 microseconds. If a type A payment medium is within operational range of antenna 106, the type A payment medium will respond within a further duration, designated by D, of approximately 150 microseconds, causing a polling Rx signal to be received by antenna 106. The duration of the polling Rx signal, designated by C, is typically approximately 200 microseconds.

Referring briefly to the right side of FIG. 3B, it is seen that for a typical type A polling sequence, the durations designated by letters, A, B, C and D in FIG. 3B are as follows:
A=approximately 500 microseconds
B=approximately 100 microseconds
C=approximately 200 microseconds
D=approximately 150 microseconds If a polling Rx signal is received, polling is terminated. If, however, a polling Rx signal is not received, after a predetermined time period, typically 7 milliseconds, from the start of the transmission of the type A polling Tx signal via antenna 106, a type B polling sequence is initiated.

The type B polling sequence may be essentially the same as the type A polling sequence described hereinabove with different time durations.

For a typical type B polling sequence, the durations designated by letters, A, B, C and D in FIG. 3B are as follows:
A=approximately 2.5 ms
B=approximately 400 microseconds
C=approximately 1400 microseconds
D=approximately 650 microseconds It is appreciated that alternatively, instead of stopping the operation of the LCD clock, the clock may be slowed sufficiently for the duration of the CCTD.

It is noted that when the LCD clock is slowed, as opposed to stopped, some data writing typically takes place during the CCTD. For example, if the LCD clock rate is slowed to typically $\frac{1}{200}^{th}$ of its usual rate, a few pixels are written during polling. This relatively small amount of data writing is considered to be insignificant in terms of interference with polling and is therefore ignored in the drawings and the description which follows.

Alternatively, as seen on the right side of FIG. 3C, in another embodiment of the present invention, the coordination control circuitry 112 (FIG. 1) instructs the LCD control circuitry 108 (FIG. 1) to disable the DE signal, thereby stopping data writing to the LCD display 102 for the duration of the CCTD.

The DE signal is disabled typically without regard to the timing of the VBI or the VSYNC signal. The precise time at which the DE signal is initially disabled may be coordinated with an HSYNC signal in order to reduce degradation of the LCD image.

It is appreciated from a consideration of the right side of FIG. 3B that upon completion of the duration of CCTD, the LCD clock typically resumes its constant rate operation, typically at 33.3 MHz, and data writing to the LCD display 102 resumes.

Once a valid polling Rx signal has been received, a determination is made as to what type of payment medium has transmitted the polling Rx signal and a suitable payment data communication procedure, typically including at least one payment data communication sequence 250, is initiated, for example by transmitting a payment data Tx signal via antenna 106.

In accordance with an embodiment of the invention, during the payment data communication sequence 250, data is not written to the LCD. This is achieved either by stopping operation of the LCD clock, as illustrated in FIG. 3B. Alternatively, this is achieved by disabling the data enable (DE) signal, as illustrated in FIG. 3C. The alternative embodiment of disabling the DE signal is used only in embodiments where the DE signal is readily manipulatable.

As seen on the right side of FIG. 3B, in one embodiment of the invention, the coordination control circuitry 112 (FIG. 1) instructs the LCD control circuitry 108 (FIG. 1) to stop the LCD clock signal, thereby stopping data writing to the LCD display 102 for the duration of the CCTD.

The LCD clock is slowed or stopped typically without regard to the timing of the VBI or the VSYNC signal. The precise time at which slowing or stopping of the LCD clock is initiated may be coordinated with an HSYNC signal in order to reduce degradation of the LCD image.

As seen on the right side of FIG. 3B, contactless data is transmitted via antenna 106, as indicated by the Tx signal, and where a payment medium is within operational range of antenna 106, contactless data is received via antenna 106 from the payment medium.

It is appreciated that alternatively, instead of stopping the operation of the LCD clock, the clock may be slowed sufficiently for the duration of the CCTD.

It is noted that when the LCD clock is slowed, as opposed to stopped, some data writing typically takes place during the CCTD. For example, if the LCD clock rate is slowed to typically $\frac{1}{200}^{th}$ of its usual rate, a few lines of pixels are written during a payment data communication. This relatively small amount of data writing is considered to be insignificant in terms of interference with payment data communication and is therefore ignored in the drawings and the description which follows.

It is appreciated from a consideration of the right side of FIG. 3B that upon completion of the duration of the CCTD, the LCD clock typically resumes its constant rate operation, typically at 33.3 MHz, and data writing to the LCD display 102 resumes.

Alternatively the LCD clock remains stopped until all payment data has been received by the point of sale device 100.

In the alternative embodiment seen on the right side of FIG. 3C, the coordination control circuitry 112 (FIG. 1) instructs the LCD control circuitry 108 (FIG. 1) to disable the DE signal, thereby stopping data writing to the LCD display 102 for the duration of the CCTD.

The DE signal is disabled typically without regard to the timing of the VBI or the VSYNC signal. The precise time at which the DE signal is initially disabled may be coordinated with an HSYNC signal in order to reduce degradation of the LCD image.

The CCTD typically continues for a duration, designated by A, of a few tens of milliseconds and the payment data Tx signal also has a duration, designated by B, of up to tens of milliseconds. The payment medium will respond within a further duration, designated by D, of approximately a few hundred microseconds, causing a payment data Rx signal to be received by antenna 106. The duration of the payment data Rx signal, designated by C, is typically approximately a few tens of milliseconds.

The foregoing payment data communication sequence is repeated until all payment data has been received by the point of sale device 100. This typically takes up to approximately one second.

It is appreciated from a consideration of the right side of FIG. 3C that upon completion of the duration of CCTD, the DE signal is again enabled and data writing to the LCD display 102 resumes.

Alternatively, the DE signal remains disabled until all payment data has been received by the point of sale device 100.

Reference is now made specifically to FIG. 2C, which illustrates yet another embodiment of the present invention wherein polling and payment data communication are both synchronized with a VSYNC signal or VBI and both polling and payment data communication require stopping or slowing an LCD clock or disabling a data enable (DE) signal, and to FIGS. 3D-3I, which are corresponding simplified timing diagrams.

In an initial stage, the coordination control circuitry 112 (FIG. 1) instructs the LCD control circuitry 108 (FIG. 1) to operate the LCD clock, which governs the LCD refresh rate and data writing to the LCD display 102, at its normal clock rate, typically approximately 33.3 MHz.

Figure 3D:
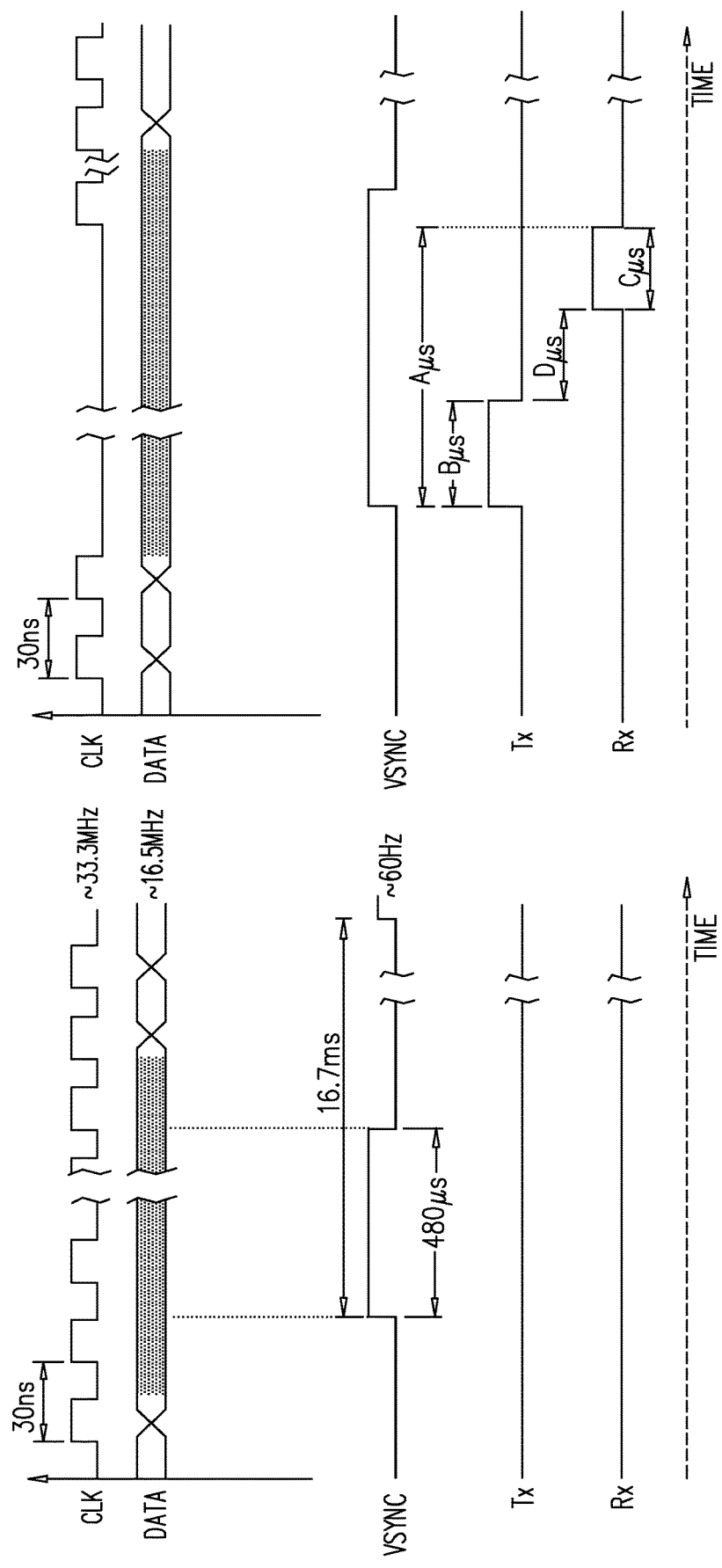
FIG. 3D is a pair of simplified timing diagrams illustrating a change in the timing operation of a display in coordination with operation of contactless payment circuitry of the point of sale device of FIG. 1 in accordance with a fourth embodiment of the present invention.

As seen in step 330 of FIG. 2C and at the left side of FIG. 3D, at an initial stage, the LCD clock operates at a constant rate of typically approximately 33.3 MHz and data is written to the LCD display 102 at a constant rate of typically approximately 16.5 MHz.

At this initial stage, contactless communication, namely polling and payment data communication does not yet take place. Accordingly, it is seen that transmit and receive signals, respectively designated Tx and Rx, which exist during contactless communication, are not yet present.

Normally, the point of sale device 100 initiates contactless communication via antenna 106 (FIG. 1) using a polling procedure. The polling procedure typically includes a number of polling sequences 340 corresponding to a number of different operational modes of payment media. For example, various different payment cards may operate in various different operational modes which may be governed by the same or different standards. For example, type A and type B payment cards may operate according to ISO/IEC Standard 14443 with different timing. These various operational modes may involve different durations of transmit and receive signals, respectively designated Tx and Rx, and different time separations therebetween.

The overall time duration required between the onset of a Tx signal and the end of the maximum period allocated for receipt of an Rx signal is defined a contactless communication time duration (CCTD). In the absence of a received Rx signal, the CCTD is a fixed predetermined period, typically 430 microseconds for type A cards and 1050 microseconds for type B cards, however if an Rx signal is received, the CCTD preferably extends until receipt thereof has been completed. In accordance with a preferred embodiment of the invention, data writing to the LCD generally does not occur during the CCTD or at least during most of it.

Typically, the polling procedure starts with a type A polling sequence, which in the absence of a response from a type A medium within a predetermined time, typically 7 ms, then proceeds with a type B polling sequence. Other types of polling sequences may follow.

In the embodiment shown in FIG. 2C, at least some of the contactless communication via antenna 106 for polling takes place when the LCD clock is stopped and data writing generally does not take place.

As seen on the right side of FIG. 3D, in this embodiment of the invention, the coordination control circuitry 112 (FIG.

1) instructs the LCD control circuitry 108 (FIG. 1) to stop the LCD clock signal at the onset of a VSYNC signal and to start a polling procedure.

As seen in FIG. 2C and on the right side of FIG. 3D, typically a type A polling sequence is initiated by device 100 by transmitting a polling Tx signal via antenna 106. In this case, the CCTD, designated by A, has a duration of up to approximately 500 microseconds and the polling Tx signal, designated by B, has a duration of approximately 100 microseconds. If a type A payment medium is within operational range of antenna 106, the type A payment medium will respond within a further duration, designated by D, of approximately 150 microseconds, causing a polling Rx signal to be received by antenna 106. The duration of the polling Rx signal, designated by C, is typically approximately 200 microseconds.

Referring briefly to the right side of FIG. 3D, it is seen that for a typical type A polling sequence, the durations designated by letters, A, B, C and D in FIG. 3D are as follows:
A=approximately 500 microseconds
B=approximately 100 microseconds
C=approximately 200 microseconds
D=approximately 150 microseconds If a polling Rx signal is received, polling is terminated. If, however, a polling Rx signal is not received, after a predetermined time period, typically 7 milliseconds, from the start of the transmission of the type A polling Tx signal via antenna 106, a type B polling sequence is initiated.

The type B polling sequence may be essentially the same as the type A polling sequence described hereinabove with different time durations.

For a typical type B polling sequence, the durations designated by letters, A, B, C and D in FIG. 3D are as follows:
A=approximately 2.5 ms
B=approximately 400 microseconds
C=approximately 1400 microseconds
D=approximately 650 microseconds It is appreciated that alternatively, instead of stopping the operation of the LCD clock, the clock may be slowed sufficiently for the duration of the CCTD.

It is noted that when the LCD clock is slowed, as opposed to stopped, some data writing typically takes place during the CCTD. For example, if the LCD clock rate is slowed to typically $\frac{1}{200}^{th}$ of its usual rate, a few pixels are written during polling. This relatively small amount of data writing is considered to be insignificant in terms of interference with polling and is therefore ignored in the drawings and the description which follows.

It is appreciated from a consideration of the right side of FIG. 3D that upon completion of the duration of CCTD, the LCD clock typically resumes its constant rate operation, typically at 33.3 MHz, and data writing to the LCD display 102 resumes.

In another alternative embodiment of the present invention seen on the right side of FIG. 3E, the coordination control circuitry 112 (FIG. 1) instructs the LCD control circuitry 108 (FIG. 1) to disable the DE signal, thereby stopping data writing to the LCD display 102 for the duration of the CCTD. It is appreciated that the duration during which the DE signal is disabled may extend beyond the duration of the VSYNC signal and also beyond the duration of the VBI.

As seen in FIG. 2C and on the right side of FIG. 3E, typically a type A polling sequence is initiated by device 100 by transmitting a polling Tx signal via antenna 106. In this case, the CCTD, designated by A, has a duration of up to approximately 500 microseconds and the polling Tx signal, designated by B, has a duration of approximately 100 microseconds. If a type A payment medium is within operational range of antenna 106, the type A payment medium will respond within a further duration, designated by D, of approximately 150 microseconds, causing a polling Rx signal to be received by antenna 106. The duration of the polling Rx signal, designated by C, is typically approximately 200 microseconds.

Referring briefly to the right side of FIG. 3E, it is seen that for a typical type A polling sequence, the durations designated by letters, A, B, C and D in FIG. 3E are as follows:
A=approximately 500 microseconds
B=approximately 100 microseconds
C=approximately 200 microseconds
D=approximately 150 microseconds If a polling Rx signal is received, polling is terminated. If, however, a polling Rx signal is not received, after a predetermined time period, typically 7 milliseconds, from the start of the transmission of the type A polling Tx signal via antenna 106, a type B polling sequence is initiated.

The type B polling sequence may be essentially the same as the type A polling sequence described hereinabove with different time durations.

For a typical type B polling sequence, the durations designated by letters, A, B, C and D in FIG. 3D are as follows:
A=approximately 2.5 ms
B=approximately 400 microseconds
C=approximately 1400 microseconds
D=approximately 650 microseconds The DE signal is disabled for the entire duration of the CCTD. The duration during which the DE signal is disabled may exceed the duration of the VSYNC.

Figure 3F:
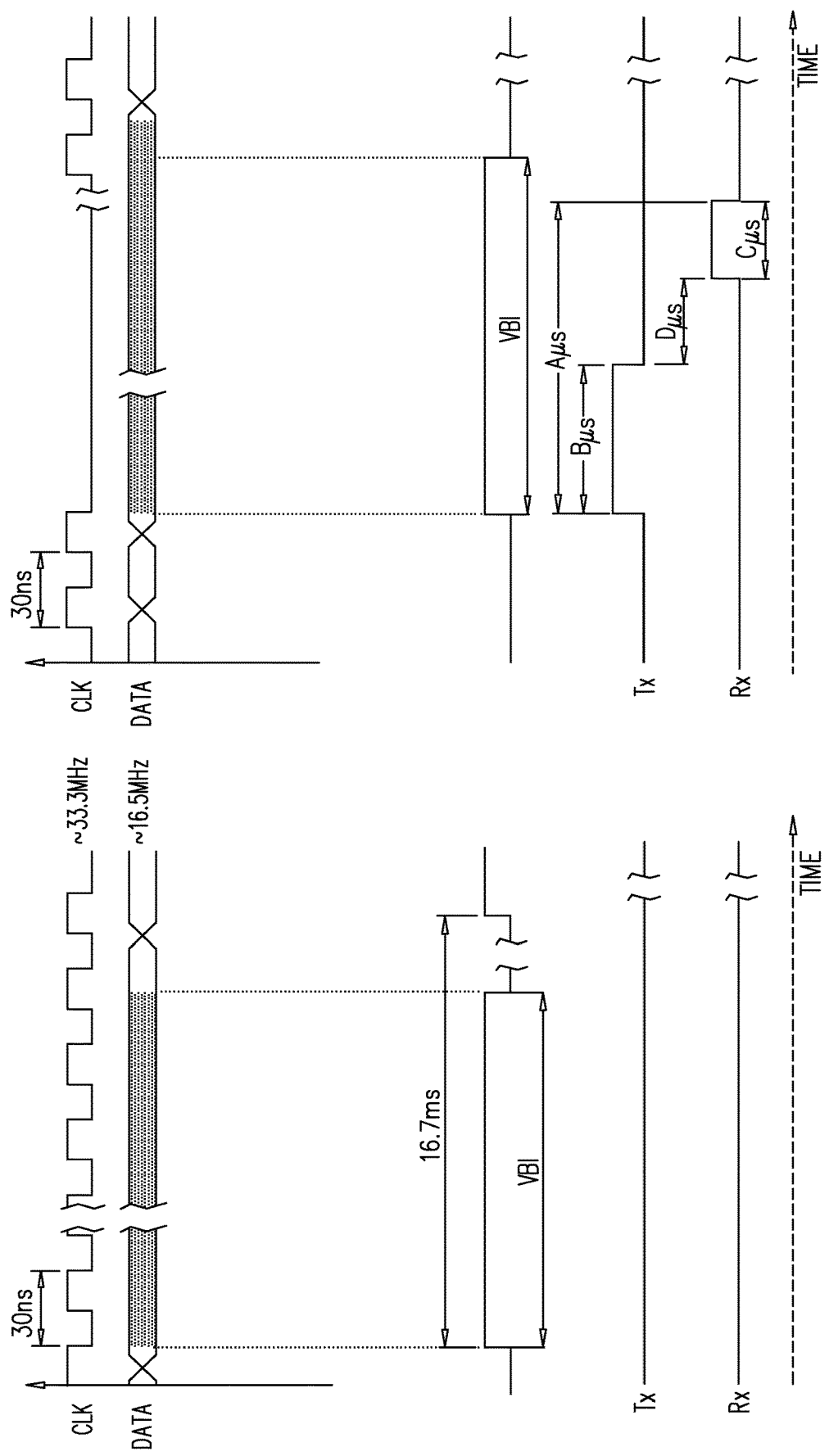
FIG. 3F is a pair of simplified timing diagrams illustrating a change in the timing operation of a display in coordination with operation of contactless payment circuitry of the point of sale device of FIG. 1 in accordance with a sixth embodiment of the present invention.

In a further alternative embodiment of the present invention seen on the right side of FIG. 3F, the coordination control circuitry 112 (FIG. 1) instructs the LCD control circuitry 108 (FIG. 1) to stop the LCD clock signal at the onset of the VBI signal and start a polling procedure.

As seen in FIG. 2C and on the right side of FIG. 3F, typically a type A polling sequence is initiated by device 100 by transmitting a polling Tx signal via antenna 106. In this case, the CCTD, designated by A, has a duration of up to approximately 500 microseconds and the polling Tx signal, designated by B, has a duration of approximately 100 microseconds. If a type A payment medium is within operational range of antenna 106, the type A payment medium will respond within a further duration, designated by D, of approximately 150 microseconds, causing a polling Rx signal to be received by antenna 106. The duration of the polling Rx signal, designated by C, is typically approximately 200 microseconds.

Referring briefly to the right side of FIG. 3F, it is seen that for a typical type A polling sequence, the durations designated by letters, A, B, C and D in FIG. 3F are as follows:
A=approximately 500 microseconds
B=approximately 100 microseconds
C=approximately 200 microseconds
D=approximately 150 microseconds If a polling Rx signal is received, polling is terminated. If, however, a polling Rx signal is not received, after a predetermined time period, typically 7 milliseconds, from the start of the transmission of the type A polling Tx signal via antenna 106, a type B polling sequence is initiated.

The type B polling sequence may be essentially the same as the type A polling sequence described hereinabove with different time durations.

For a typical type B polling sequence, the durations designated by letters, A, B, C and D in FIG. 3F are as follows:
A=approximately 2.5 ms
B=approximately 400 microseconds
C=approximately 1400 microseconds
D=approximately 650 microseconds It is appreciated that alternatively, instead of stopping the operation of the LCD clock, the clock may be slowed sufficiently for the duration of the CCTD.

It is noted that when the LCD clock is slowed, as opposed to stopped, some data writing typically takes place during the CCTD. For example, if the LCD clock rate is slowed to typically $1/200^{th}$ of its usual rate, a few pixels are written during polling. This relatively small amount of data writing is considered to be insignificant in terms of interference with polling and is therefore ignored in the drawings and the description which follows.

Figure 3G:
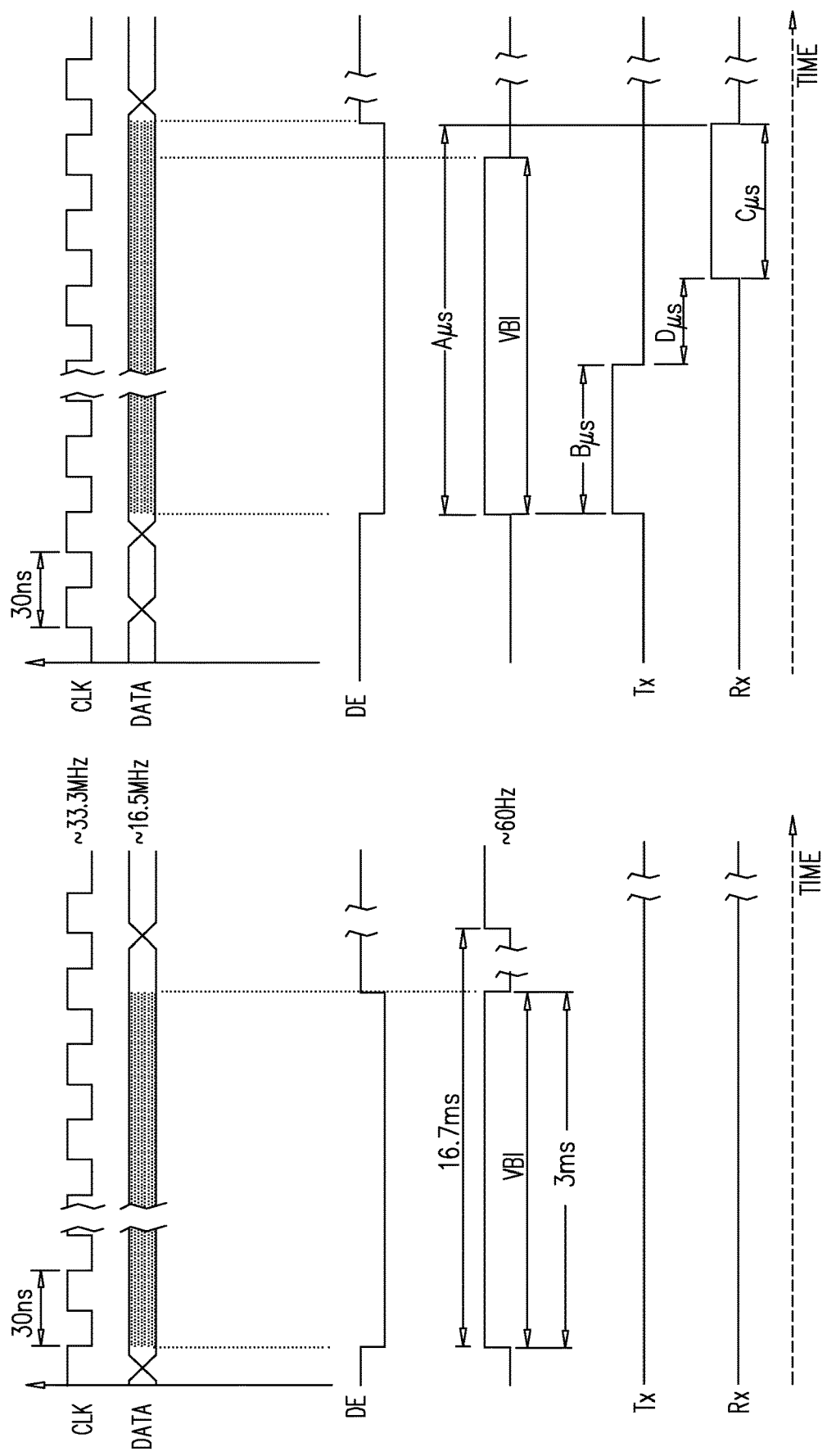
FIG. 3G is a pair of simplified timing diagrams illustrating a change in the timing operation of a display in coordination with operation of contactless payment circuitry of the point of sale device of FIG. 1 in accordance with a seventh embodiment of the present invention.

In another alternatively embodiment of the present invention seen on the right side of FIG. 3G, the coordination control circuitry 112 (FIG. 1) instructs the LCD control circuitry 108 (FIG. 1) to disable the DE signal, thereby stopping data writing to the LCD display 102 for the duration of the CCTD, at least partially in synchronization with the VBI. It is appreciated that the duration during which the DE signal is disabled may extend beyond the duration of the VBI.

As seen in FIG. 2C and on the right side of FIG. 3G, typically a type A polling sequence is initiated by device 100 by transmitting a polling Tx signal via antenna 106. In this case, the CCTD, designated by A, has a duration of up to approximately 500 microseconds and the polling Tx signal, designated by B, has a duration of approximately 100 microseconds. If a type A payment medium is within operational range of antenna 106, the type A payment medium will respond within a further duration, designated by D, of approximately 150 microseconds, causing a polling Rx signal to be received by antenna 106. The duration of the polling Rx signal, designated by C, is typically approximately 200 microseconds.

Referring briefly to the right side of FIG. 3G, it is seen that for a typical type A polling sequence, the durations designated by letters, A, B, C and D in FIG. 3D are as follows:
A=approximately 500 microseconds
B=approximately 100 microseconds
C=approximately 200 microseconds
D=approximately 150 microseconds If a polling Rx signal is received, polling is terminated. If, however, a polling Rx signal is not received, after a predetermined time period, typically 7 milliseconds, from the start of the transmission of the type A polling Tx signal via antenna 106, a type B polling sequence is initiated.

The type B polling sequence may be essentially the same as the type A polling sequence described hereinabove with different time durations.

For a typical type B polling sequence, the durations designated by letters, A, B, C and D in FIG. 3D are as follows:
A=approximately 2.5 ms
B=approximately 400 microseconds
C=approximately 1400 microseconds
D=approximately 650 microseconds The DE signal is disabled for the entire duration of the CCTD. The duration during which the DE signal is disabled may exceed the duration of the VBI.

Figure 3H:
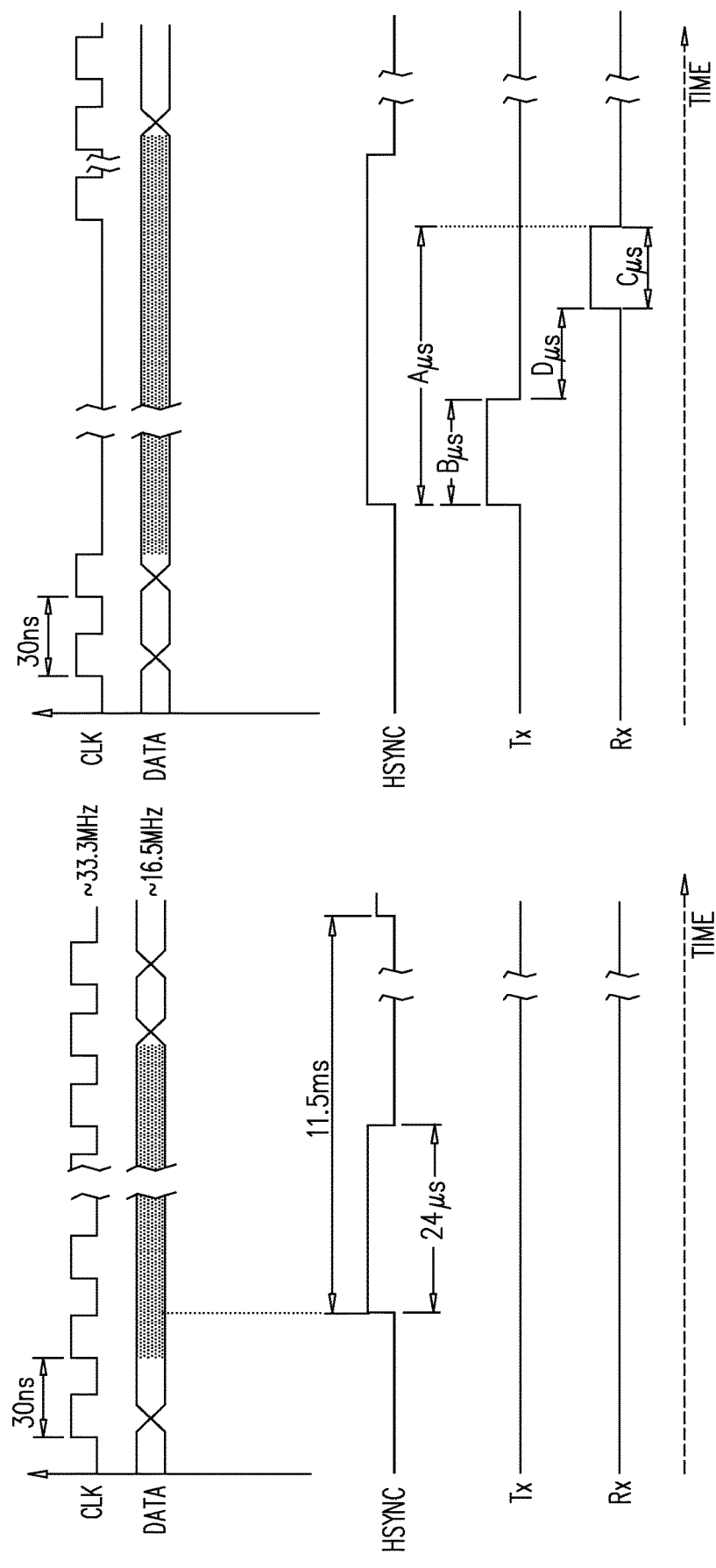
FIG. 3H is a pair of simplified timing diagrams illustrating a change in the timing operation of a display in coordination with operation of contactless payment circuitry of the point of sale device of FIG. 1 in accordance with a eighth embodiment of the present invention.
Figure 31:
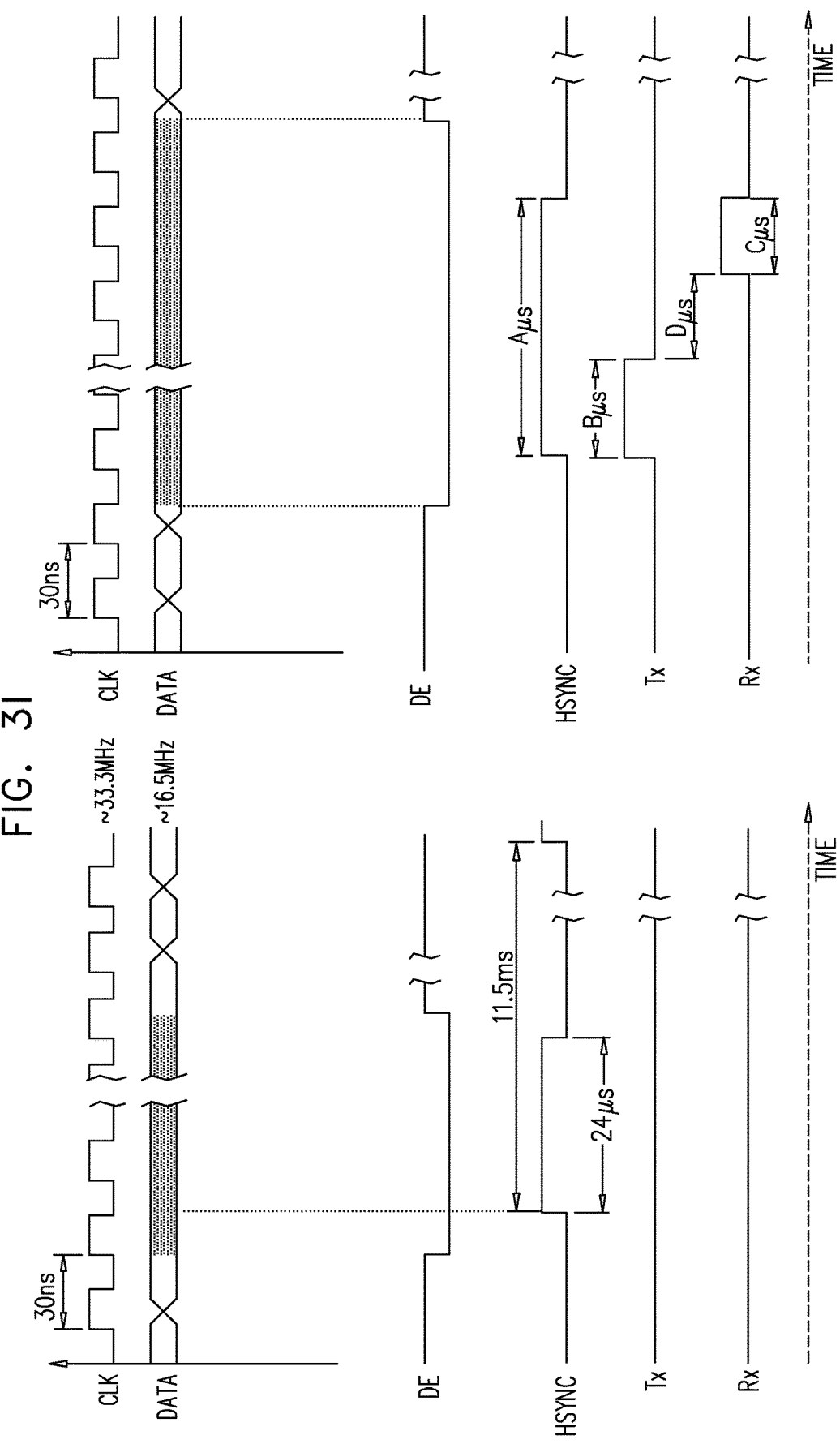

In another alternative embodiment of the present invention seen on the right side of FIG. 3H, the coordination control circuitry 112 (FIG. 1) instructs the LCD control circuitry 108 (FIG. 1) to stop the LCD clock signal at the onset of an HSYNC signal and to start a polling procedure.

It is appreciated that for the duration of the HSYNC signal no data is written on LCD display 102.

As seen in FIG. 2C and on the right side of FIG. 3H, typically a type A polling sequence is initiated by device 100 by transmitting a polling Tx signal via antenna 106. In this case, the CCTD, designated by A, has a duration of up to approximately 500 microseconds and the polling Tx signal, designated by B, has a duration of approximately 100 microseconds. If a type A payment medium is within operational range of antenna 106, the type A payment medium will respond within a further duration, designated by D, of approximately 150 microseconds, causing a polling Rx signal to be received by antenna 106. The duration of the polling Rx signal, designated by C, is typically approximately 200 microseconds.

Referring briefly to the right side of FIG. 3H, it is seen that for a typical type A polling sequence, the durations designated by letters, A, B, C and D in FIG. 3H are as follows:
A=approximately 500 microseconds
B=approximately 100 microseconds
C=approximately 200 microseconds
D=approximately 150 microseconds If a polling Rx signal is received, polling is terminated. If, however, a polling Rx signal is not received, after a predetermined time period, typically 7 milliseconds, from the start of the transmission of the type A polling Tx signal via antenna 106, a type B polling sequence is initiated.

The type B polling sequence may be essentially the same as the type A polling sequence described hereinabove with different time durations.

For a typical type B polling sequence, the durations designated by letters, A, B, C and D in FIG. 3H are as follows:
A=approximately 2.5 ms
B=approximately 400 microseconds
C=approximately 1400 microseconds
D=approximately 650 microseconds It is appreciated that alternatively, instead of stopping the operation of the LCD clock, the clock may be slowed sufficiently for the duration of the CCTD.

It is noted that when the LCD clock is slowed, as opposed to stopped, some data writing typically takes place during the CCTD. For example, if the LCD clock rate is slowed to typically $1/200^{th}$ of its usual rate, a few pixels are written during polling. This relatively small amount of data writing is considered to be insignificant in terms of interference with polling and is therefore ignored in the drawings and the description which follows.

It is appreciated from a consideration of the right side of FIG. 3H that upon completion of the duration of CCTD, the LCD clock typically resumes its constant rate operation, typically at 33.3 MHz, and data writing to the LCD display 102 resumes.

In still a further alternative embodiment of the present invention seen on the right side of FIG. 3I, the coordination control circuitry 112 (FIG. 1) instructs the LCD control circuitry 108 (FIG. 1) to disable the DE signal, thereby stopping data writing to the LCD display 102 for the duration of the CCTD. It is appreciated that the duration during which the DE signal is disabled may extend beyond the duration of the HSYNC signal and also beyond the duration of the VBI.

As seen in FIG. 2C and on the right side of FIG. 3I, typically a type A polling sequence is initiated by device 100 by transmitting a polling Tx signal via antenna 106. In this case, the CCTD, designated by A, has a duration of up to approximately 500 microseconds and the polling Tx signal, designated by B, has a duration of approximately 100 microseconds. If a type A payment medium is within operational range of antenna 106, the type A payment medium will respond within a further duration, designated by D, of approximately 150 microseconds, causing a polling Rx signal to be received by antenna 106. The duration of the polling Rx signal, designated by C, is typically approximately 200 microseconds.

Referring briefly to the right side of FIG. 3I, it is seen that for a typical type A polling sequence, the durations designated by letters, A, B, C and D in FIG. 3I are as follows:
  A=approximately 500 microseconds
  B=approximately 100 microseconds
  C=approximately 200 microseconds
  D=approximately 150 microseconds If a polling Rx signal is received, polling is terminated. If, however, a polling Rx signal is not received, after a predetermined time period, typically 7 milliseconds, from the start of the transmission of the type A polling Tx signal via antenna 106, a type B polling sequence is initiated.

The type B polling sequence may be essentially the same as the type A polling sequence described hereinabove with different time durations.

For a typical type B polling sequence, the durations designated by letters, A, B, C and D in FIG. 3I are as follows:
  A=approximately 2.5 ms
  B=approximately 400 microseconds
  C=approximately 1400 microseconds
  D=approximately 650 microseconds The DE signal is disabled for the entire duration of the CCTD. The duration during which the DE signal is disabled exceeds the duration of the HSYNC signal.

As seen in FIG. 2C, once a valid polling Rx signal has been received, a determination is made as to what type of payment medium has transmitted the polling Rx signal and a suitable payment data communication procedure, typically including at least one payment data communication sequence 350, is initiated for example by transmitting a payment data Tx signal via antenna 106.

In accordance with an embodiment of the invention, during the payment data communication sequence 350, data is generally not written to the LCD display 102. Payment data is synchronized with either VBI, VSYNC or HSYNC signal. This is achieved either by slowing or stopping operation of the LCD clock, as illustrated in FIGS. 3D, 3F and 3H or, alternatively, by disabling the data enable (DE) signal, as illustrated in FIGS. 3E, 3G and 3I. The alternative embodiment of disabling the DE signal is used only in embodiments where the DE signal is readily manipulatable. It is noted that the DE signal is normally disabled during the HSYNC and during the VBI and therefore for the duration of the VSYNC signal.

As seen in FIG. 2C and further shown in the embodiment on the right side of FIG. 3D, the coordination control circuitry 112 (FIG. 1) instructs the LCD control circuitry 108 (FIG. 1) to stop the LCD clock signal at the onset of the VSYNC signal and to start a payment data communication sequence 350.

As seen on the right side of FIG. 3D, contactless data is transmitted via antenna 106, as indicated by the Tx signal, and where a payment medium is within operational range of antenna 106, contactless data is received via antenna 106 from the payment medium.

The CCTD typically continues for a duration, designated by A, of a few tens of milliseconds and the payment data Tx signal also has a duration, designated by B, of up to tens of milliseconds. The payment medium will respond within a further duration, designated by D, of approximately a few hundred microseconds, causing a payment data Rx signal to be received by antenna 106. The duration of the payment data Rx signal, designated by C, is typically approximately a few tens of milliseconds.

The foregoing payment data communication sequence is repeated until all payment data has been received by the point of sale device 100. This typically takes up to approximately one second.

It is appreciated that alternatively, instead of stopping the operation of the LCD clock, the clock may be slowed sufficiently for the duration of the CCTD.

It is noted that when the LCD clock is slowed, as opposed to stopped, some data writing typically takes place during the CCTD. For example, if the LCD clock rate is slowed to typically $\frac{1}{200}^{th}$ of its usual rate, a few lines of pixels are written during a payment data communication. This relatively small amount of data writing is considered to be insignificant in terms of interference with payment data communication and is therefore ignored in the drawings and the description which follows.

It is appreciated from a consideration of the right side of FIG. 3D that upon completion of the duration of CCTD, the LCD clock typically resumes its constant rate operation, typically at 33.3 MHz, and data writing to the LCD display 102 resumes.

Alternatively the LCD clock remains stopped until all payment data has been received by the point of sale device 100.

In another alternative embodiment of the present invention seen on the right side of FIG. 3E, the coordination control circuitry 112 (FIG. 1) instructs the LCD control circuitry 108 (FIG. 1) to disable the DE signal, preferably coordinated with a VSYNC signal, thereby stopping data writing to the LCD display 102 for the duration of the CCTD. It is appreciated that the duration during which the DE signal is disabled may extend beyond the duration of the VSYNC signal and also beyond the duration of the VBI.

As seen in FIG. 2C and on the right side of FIG. 3E, contactless data is transmitted via antenna 106, as indicated by the Tx signal, and where a payment medium is within operational range of antenna 106, contactless data is received via antenna 106 from the payment medium.

The CCTD typically continues for a duration, designated by A, of a few tens of milliseconds and the payment data Tx signal also has a duration, designated by B, of up to tens of milliseconds. The payment medium will respond within a further duration, designated by D, of approximately a few hundred microseconds, causing a payment data Rx signal to be received by antenna 106. The duration of the payment data Rx signal, designated by C, is typically approximately a few tens of milliseconds.

The foregoing payment data communication sequence is repeated until all payment data has been received by the point of sale device 100. This typically takes up to approximately one second.

In a further alternative embodiment of the present invention seen on the right side of FIG. 3F, the coordination control circuitry 112 (FIG. 1) instructs the LCD control circuitry 108 (FIG. 1) to stop the LCD clock signal at the onset of the VBI signal, thereby stopping data writing to the LCD display 102 for the duration of the CCTD.

As seen in FIG. 2C and on the right side of FIG. 3F, contactless data is transmitted via antenna 106, as indicated by the Tx signal, and where a payment medium is within operational range of antenna 106, contactless data is received via antenna 106 from the payment medium.

The CCTD typically continues for a duration, designated by A, of a few tens of milliseconds and the payment data Tx signal also has a duration, designated by B, of up to tens of milliseconds. The payment medium will respond within a further duration, designated by D, of approximately a few hundred microseconds, causing a payment data Rx signal to be received by antenna 106. The duration of the payment data Rx signal, designated by C, is typically approximately a few tens of milliseconds.

The foregoing payment data communication sequence is repeated until all payment data has been received by the point of sale device 100. This typically takes up to approximately one second.

It is appreciated that alternatively, instead of stopping the operation of the LCD clock, the clock may be slowed sufficiently for the duration of the CCTD.

It is appreciated from a consideration of the right side of FIG. 3F that upon completion of the duration of CCTD, the LCD clock typically resumes its constant rate operation, typically at 33.3 MHz, and data writing to the LCD display 102 resumes.

In yet a further alternative embodiment of the present invention seen on the right side of FIG. 3G, the coordination control circuitry 112 (FIG. 1) instructs the LCD control circuitry 108 (FIG. 1) to disable the DE signal at the onset of a VBI signal, thereby stopping data writing to the LCD display 102 for the duration of the CCTD. It is appreciated that the duration during which the DE signal is disabled may extend beyond the duration of the VBI.

As seen in FIG. 2C and on the right side of FIG. 3G, contactless data is transmitted via antenna 106, as indicated by the Tx signal, and where a payment medium is within operational range of antenna 106, contactless data is received via antenna 106 from the payment medium.

The CCTD typically continues for a duration, designated by A, of a few tens of milliseconds and the payment data Tx signal also has a duration, designated by B, of up to tens of milliseconds. The payment medium will respond within a further duration, designated by D, of approximately a few hundred microseconds, causing a payment data Rx signal to be received by antenna 106. The duration of the payment data Rx signal, designated by C, is typically approximately a few tens of milliseconds.

The foregoing payment data communication sequence is repeated until all payment data has been received by the point of sale device 100. This typically takes up to approximately one second.

In yet another embodiment of the present invention seen on the right side of FIG. 3H, the coordination control circuitry 112 (FIG. 1) instructs the LCD control circuitry 108 (FIG. 1) to slow or stop the LCD clock signal at the onset of the HSYNC signal and to start payment data communication. It is appreciated that during an HSYNC signal no data is written to LCD display 102.

As seen on the right side of FIG. 3H, contactless data is transmitted via antenna 106, as indicated by the Tx signal, and where a payment medium is within operational range of antenna 106, contactless data is received via antenna 106 from the payment medium.

The CCTD typically continues for a duration, designated by A, of a few tens of milliseconds and the payment data Tx signal also has a duration, designated by B, of up to tens of milliseconds. The payment medium will respond within a further duration, designated by D, of approximately a few hundred microseconds, causing a payment data Rx signal to be received by antenna 106. The duration of the payment data Rx signal, designated by C, is typically approximately a few tens of milliseconds.

The foregoing payment data communication sequence is repeated until all payment data has been received by the point of sale device 100. This typically takes up to approximately one second.

It is appreciated that alternatively, instead of stopping the operation of the LCD clock, the clock may be slowed sufficiently for the duration of the CCTD.

It is noted that when the LCD clock is slowed, as opposed to stopped, some data writing typically takes place during the CCTD. For example, if the LCD clock rate is slowed to typically $\frac{1}{200}^{th}$ of its usual rate, a few lines of pixels are written during a payment data communication. This relatively small amount of data writing is considered to be insignificant in terms of interference with payment data communication and is therefore ignored in the drawings and the description which follows.

It is appreciated from a consideration of the right side of FIG. 3H that upon completion of the duration of CCTD, the LCD clock typically resumes its constant rate operation, typically at 33.3 MHz, and data writing to the LCD display 102 typically resumes at the end of the HSYNC signal.

In still another alternative embodiment of the present invention seen on the right side of FIG. 3I, the coordination control circuitry 112 (FIG. 1) instructs the LCD control circuitry 108 (FIG. 1) to disable the DE signal at the onset of an HSYNC signal and to start payment data communication. It is appreciated that the duration during which the DE signal is disabled may extend beyond the duration of the HSYNC signal.

As seen in FIG. 2C and on the right side of FIG. 3I, contactless data is transmitted via antenna 106, as indicated by the Tx signal, and where a payment medium is within operational range of antenna 106, contactless data is received via antenna 106 from the payment medium.

The CCTD typically continues for a duration, designated by A, of a few tens of milliseconds and the payment data Tx signal also has a duration, designated by B, of up to tens of milliseconds. The payment medium will respond within a further duration, designated by D, of approximately a few hundred microseconds, causing a payment data Rx signal to be received by antenna 106. The duration of the payment data Rx signal, designated by C, is typically approximately a few tens of milliseconds.

The foregoing payment data communication sequence is repeated until all payment data has been received by the point of sale device 100. This typically takes up to approximately one second.

It will be appreciated by persons skilled in the art that the present invention is not limited to what has been particularly shown and described hereinabove. Rather the scope of the invention includes both combinations and subcombinations of the various features described hereinabove as well as modifications and variations thereof which would occur to persons skilled in the art upon reading the foregoing description and which are not in the prior art.

The invention claimed is:
1. A point of sale device comprising:
   an LCD display;
   a contactless payment antenna arranged in propinquity to said LCD display;

contactless communication circuitry associated with said contactless payment antenna;

LCD control circuitry, wherein said LCD control circuitry has at least first and second refresh rates and is operative at a first, lower refresh rate during operation of said contactless communication circuitry in carrying out a transaction and at a second, higher refresh rate at times when said contactless communication circuitry is not carrying out the transaction; and coordination control circuitry, operative to control operation of said LCD control circuitry thereby to reduce interference to operation of said contactless communication circuitry resulting from operation of said LCD display.

2. The point of sale device according to claim 1 and wherein said contactless communication circuitry is operative at least during at least one of a vertical blanking interval (VBI), a VSYNC signal duration, and a HSYNC signal duration in the operation of said LCD control circuitry.

3. The point of sale device according to claim 1 and wherein said contactless payment antenna is disposed behind said LCD display.

4. The point of sale device according to claim 1 and wherein said contactless payment antenna is disposed surrounding said LCD display.

5. The point of sale device according to claim 1 and wherein said coordination control circuitry is operative to cause said LCD control circuitry and said contactless communication circuitry to operate in time coordination with each other in order to reduce interference therebetween.

6. The point of sale device according to claim 1 and wherein:
said LCD control circuitry provides a clock signal and a data enable signal; and
said coordination control circuitry is operative to vary at least one of said clock signal and said data enable signal in order to reduce interference between said LCD display and operation of said contactless communication circuitry.

7. The point of sale device according to claim 6 and wherein said coordination control circuitry is operative to disable said data enable signal during at least some of transmit/receive time duration of said contactless communication circuitry.

8. The point of sale device according to claim 6 and wherein said coordination control circuitry is operative to disable said data enable signal during at least one of a polling operation and a payment data transfer operation of said contactless communication circuitry.

9. The point of sale device according to claim 6 and wherein said coordination control circuitry is operative to at least one of slow said clock signal and stop said clock signal during at least some of transmit/receive time duration of said contactless communication circuitry.

10. The point of sale device according to claim 6 and wherein said coordination control circuitry is operative to at least one of slow said clock signal and stop said clock signal during at least one of a polling operation and a payment data transfer operation of said contactless communication circuitry.

11. The point of sale device according to claim 6 and wherein said coordination control circuitry is operative to at least one of slow said clock signal and stop said clock signal to an extent responsive to an amount of data to be transferred during payment data transfer operation of said contactless communication circuitry.

12. The point of sale device according to claim 2 and wherein said coordination control circuitry is operative to at least partially synchronize payment data transfer operation of said contactless communication circuitry with the HSYNC signal of said LCD display.

13. A point of sale device comprising:
an LCD display;
a contactless payment antenna arranged in propinquity to said LCD display;
contactless communication circuitry associated with said contactless payment antenna;
LCD control circuitry, said LCD control circuitry has at least first and second duty cycles for writing of data to said LCD display and is operative at a first, lower duty cycle during operation of said contactless communication circuitry in carrying out a transaction and at a second, higher duty cycle at times when said contactless communication circuitry is not carrying out the transaction; and
coordination control circuitry, operative to control operation of said LCD control circuitry thereby to reduce interference to operation of said contactless communication circuitry resulting from operation of said LCD display.

14. A method of operating an LCD display in propinquity to a contactless antenna, the method comprising:
providing LCD control circuitry and contactless communication circuitry associated with said contactless antenna; and
controlling operation of said LCD control circuitry thereby to reduce interference to operation of said contactless communication circuitry resulting from operation of said LCD display by operating said LCD control circuitry at a first, lower refresh rate during operation of said contactless communication circuitry in carrying out a transaction and at a second, higher refresh rate at times when said contactless communication circuitry is not carrying out the transaction.

15. The method of claim 14, further comprising operating said contactless communication circuitry at least during at least one of a vertical blanking interval (VBI), a VSYNC signal duration, and a HSYNC signal duration in the operation of said LCD control circuitry.

16. The method of claim 14, wherein said LCD control circuitry provides a clock signal and a data enable signal, and further comprising varying at least one of said clock signal and said data enable signal in order to reduce interference between said LCD display and operation of said contactless communication circuitry.

17. The method of claim 14, wherein said LCD control circuitry provides a data enable signal, and further comprising disabling said data enable signal during at least some of transmit/receive time duration of said contactless communication circuitry.

18. The method of claim 14, wherein said LCD control circuitry provides a data enable signal, and further comprising disabling said data enable signal during at least one of a polling operation and a payment data transfer operation of said contactless communication circuitry.

19. The method of claim 14, wherein said LCD control circuitry provides a clock signal and further comprising slowing or stopping said clock signal during at least some of transmit/receive time duration of said contactless communication circuitry.

20. The method of claim 14, wherein said LCD control circuitry provides a clock signal and further comprising slowing or stopping said clock signal during at least one of a polling operation and a payment data transfer operation of said contactless communication circuitry.

\* \* \* \* \*